(12) United States Patent
May et al.

(10) Patent No.: US 6,581,480 B1
(45) Date of Patent: Jun. 24, 2003

(54) MAGNETISING ARRANGEMENTS FOR TORQUE/FORCE SENSOR

(75) Inventors: Lutz Axel May, Gelting (DE); Neill Brodey, Oxfordshire (GB); John Owsley, Berkshire (GB)

(73) Assignee: Fast Technology AG (DE)

( * ) Notice: Subject to any disclaimer, the term of this patent is extended or adjusted under 35 U.S.C. 154(b) by 0 days.

(21) Appl. No.: 09/673,930

(22) PCT Filed: Mar. 11, 1999

(86) PCT No.: PCT/GB99/00736

§ 371 (c)(1),
(2), (4) Date: Mar. 28, 2001

(87) PCT Pub. No.: WO99/56099

PCT Pub. Date: Nov. 4, 1999

(30) Foreign Application Priority Data

Apr. 23, 1998 (GB) ............................................. 9808792

(51) Int. Cl.[7] ................................................. G01L 3/10
(52) U.S. Cl. ................................................. 73/862.333
(58) Field of Search ...... 73/862.331, 862.333–862.334, 73/862.335–862.336, 862.193

(56) References Cited

U.S. PATENT DOCUMENTS

| 4,803,885 | A | * | 2/1989 | Nonomura et al. | ..... 73/862.333 |
| 5,522,269 | A | * | 6/1996 | Takeda et al. | ......... 73/862.333 |
| 5,705,756 | A | * | 1/1998 | LeMarquand et al. | ...... 340/665 |
| 6,098,468 | A | * | 8/2000 | Mohri et al. | ........... 73/862.333 |
| 6,330,833 | B1 | * | 12/2001 | Opie et al. | ............. 73/862.333 |
| 6,467,360 | B1 | * | 10/2002 | Bogdanov | .............. 73/862.333 |

\* cited by examiner

*Primary Examiner*—Max Noori
(74) *Attorney, Agent, or Firm*—Robert C. Kain, Jr.; Fleit, Kain

(57) ABSTRACT

A magnetoclastic transducer for sensing a torque in a shaft (150) is formed by circumferentially magnetising a magnetisable, integral portion (156) of the shaft. To assist in the emanation of a flux-dependent torque, the transducer element portion (156) of the shaft may have further circumferentially magnetised portions (154, 158) to each side. These further portions (154, 158) are of opposite polarity magnetisation to that of the transducer element (156). The external magnetic flux emanated by the transducer (156) is a function of torque and is detectable by a magnetic field sensor (160). An alternative means for the same purpose is to provide the transducer element at a portion (172) of the shaft (170) having an integral annular section of raised profile projecting beyond adjoining portions of the shaft. The shaft may be provided with a series of circumferentially magnetised portions of alternating polarity. A number of ways of achieving circumferential magnetisation are described, together with other directions such as axial. A shaft having the whole or an integral portion of it magnetised can also be used to provide a force transducer sensitive to bending moment induced in the shaft by a force to be measured.

18 Claims, 18 Drawing Sheets

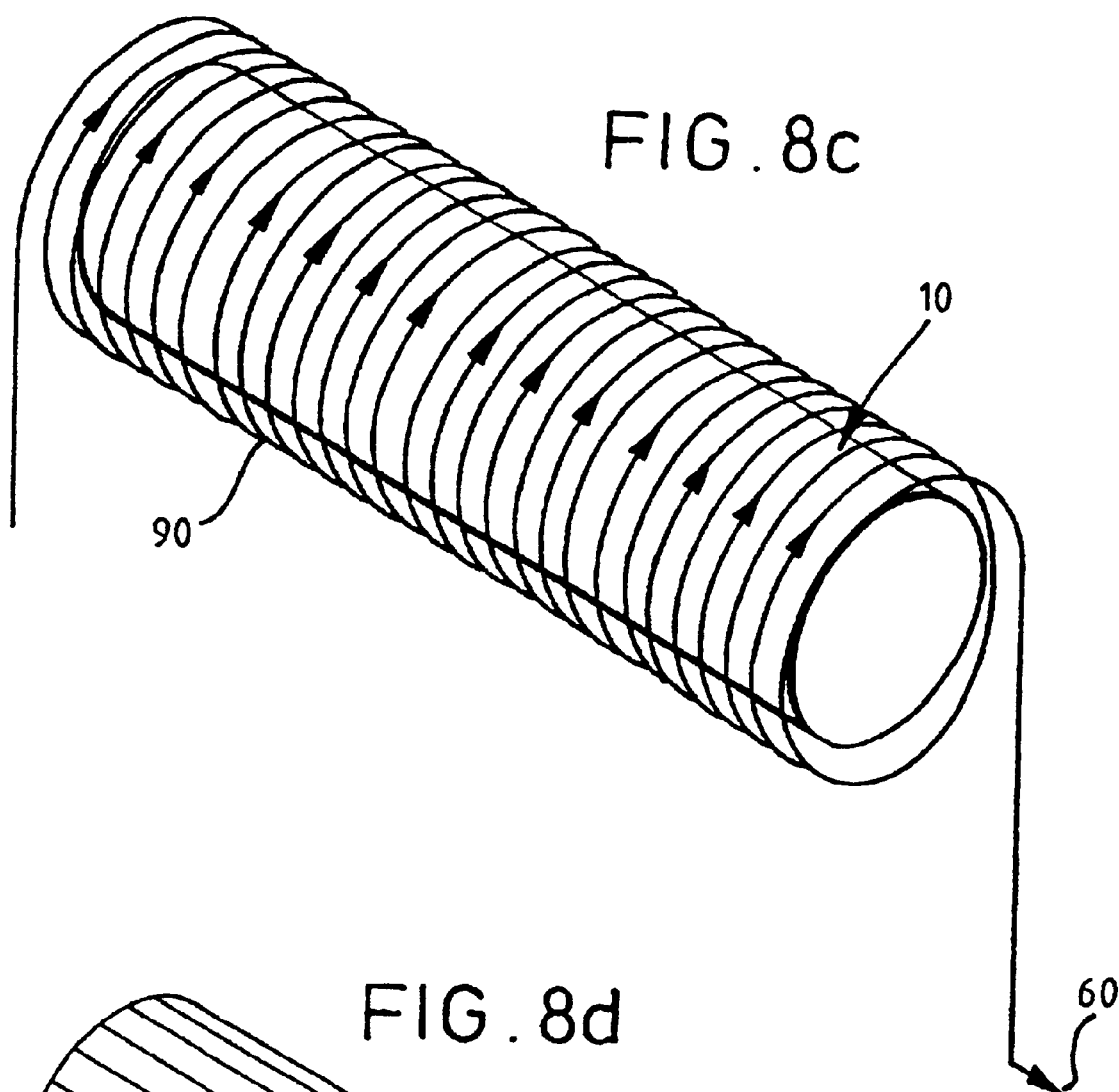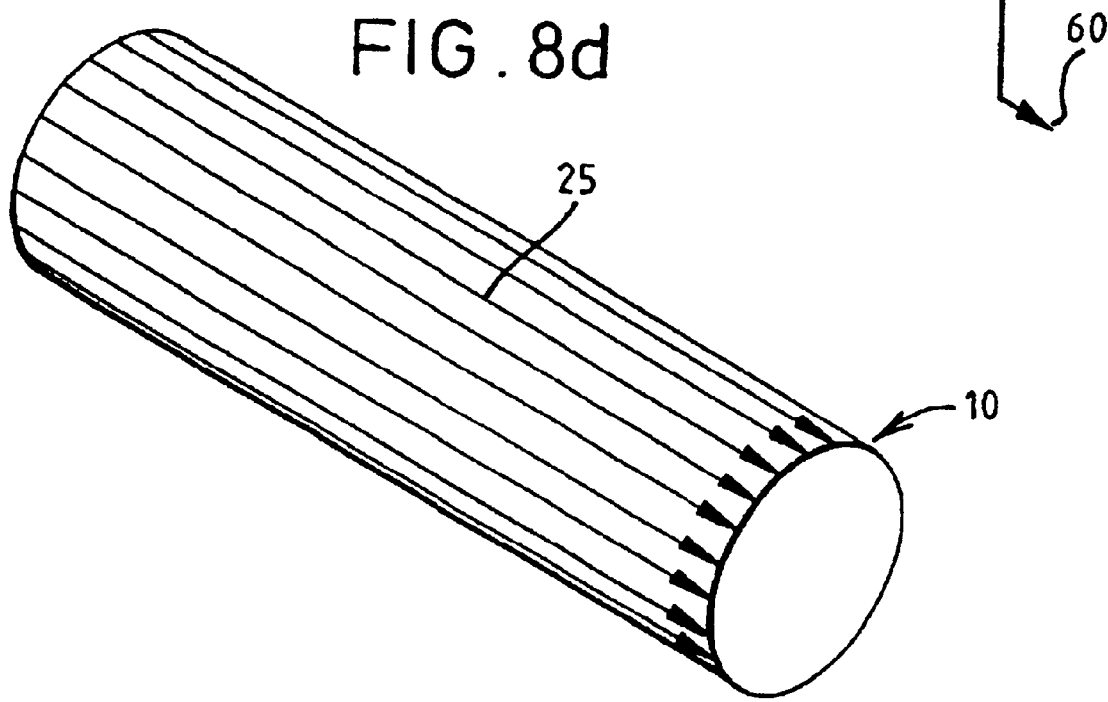

MAGNETISING ARRANGEMENTS FOR TORQUE/FORCE SENSOR

FIELD OF THE INVENTION

This invention relates to a sensor arrangement for sensing a torque or flexural force in a shaft and to a method and apparatus for inducing a magnetic field in a shaft for sensing by a sensor arrangement. The invention also relates to shafts incorporating transducer elements and to a method of producing a magnetically calibrated shaft for use in a torque sensor.

BACKGROUND TO THE INVENTION

Magnetic torque sensors are known in the art. They are based on a phenomenon commonly referred to as magnetoelasticity. Known sensors use a magnetized ring secured to a shaft so that torque in the shaft is transmitted to the ring which acts as a transducer element. The sensor also includes one or more magnetic field sensitive elements external to the ring to sense a disturbance of the magnetic field due to the torque resulting from rotation or a torque applied to a non-rotatable shaft. The rotation of any shaft from one end to drive a load at the other end generates torque in the shaft due to differential angular displacement (which may be very small) between the point at which drive is applied and the point at which the load is driven. The same applies to a shaft having one fixed end and another end subject to torque. More particularly to measure this torque the magnetized ring of a magnetic torque sensor has established within it a magnetic field that is essentially confined within the ring. The torque distortion causes magnetic flux to emanate from the ring in proportion to the torque so that the flux can be sensed by one or more external sensing elements.

Various forms of magnetic field sensitive elements have been proposed. One proposal is to sense the small changes in magnetic field due to applied torque, by use of saturable coils (inductors) driven into saturation so that the point of saturation of a coil, with respect to a drive current, depends on the torque-induced external magnetic field associated with the magnetised ring. The points of saturation for the opposite drive polarities in the coil become unbalanced due to the presence of an external field and it is this unbalance that is sensed. Circuitry responsive to the point of saturation is used to develop an output signal representing torque.

Other magnetic field sensing elements have been proposed as is mentioned below.

Thus in general the prior proposed torque sensor comprises two parts: one is the transducer element mounted to the shaft; the other is the sensor element(s) and associated circuitry for driving the elements where necessary and for processing the torque-dependent signals to derive an output representing the measured torque. This other part of the sensor is mountable in a static fashion with the sensor elements closely adjacent to but not contacting the transducer element.

By way of example, a magnetometer using a saturating inductor and the associated circuitry is described in U.S. Pat. No. 5,124,648 (Webb and Brokaw). More detailed information on the mounting of torque sensor coils (inductors) with respect to rotary shafts is to be found in U.S. Pat. No. 5,520,054 (Garshelis). Reference may also be made to a technical paper published by the Society of Automotive Engineers (SAE), "Development of a Non-Contact Torque Transducer for Electric Power Steering Systems", SAE Technical Paper Series, No. 920707, I. J. Garshelis, K. Whitney and L. May, reprinted from: Sensors and Actuators, 1992 (SP-903), International Congress and Exposition, Detroit, Mich., Feb. 24–28, 1992, pp. 173–182. Further discussion of torque transducers is found in "A Single Transducer for Non-Contact Measurement of the Power, Torque and Speed of a Rotating Shaft", I. J. Garshelis, C. R. Conto and W. S. Fiegel, SAE Technical Paper Series, No. 950536, reprinted from: Sensors and Actuators (SP-1066), International Congress and Exposition, Detroit, Mich., Feb. 27–Mar. 2, 1995, pp. 57–65, particularly pp. 58–59.

An example of a commercially-offered magnetoelastic torque transducer is that offered under the trade mark TorqStar by the Lebow Products division of Eaton Corporation, 1728 Maplelawn Road, Troy, Mich., U.S.A.

Torque sensing arrangements based on magnetoelasticity are described in related U.S. Pat. Nos. 5,351,555 and 5,465,627 Garshelis, assigned to Magnetoelastic Devices, Inc.) and in U.S. Pat. No. 5,520,059 (Garshelis, assigned to Magnetoelastic Devices, Inc.).

U.S. Pat. Nos. 5,351,555 and 5,465,627 are primarily concerned with torque sensing arrangements described in these patents utilize a magnetised ring or torus secured to the shaft, the torque in which is to be measured, and a non-contacting sensor responsive to changes in the magnetic field external to the ring that arise from stresses in the shaft when the shaft is put under torque. The non-contacting torque sensor may use coil assemblies or other devices sensitive to magnetic fields, e.g. Hall effect devices, magnetoresistive devices and so on.

In these patents there is a single circumferential field generated in the ring which in the no-torque state is entirely contained within the ring. The conditions for the establishment of such a field are discussed in these patents. Emphasis is laid on two practical requirements:

1) the ring is endowed with an effective uniaxial magnetic anisotropy having the circumferential direction as the easy axis
2) the ring is subject to hoop stress, that is a stress tending to expand the ring.

There is also a suggestion in these two patents that the separate ring can be implemented in the form of a ring of suitable material cast on to the shaft by spraying or explosively welded on to the shaft, or a ring of surface modified material formed in the shaft as by ion implantation. None of the suggestions is taught in detail and to the present Applicant's knowledge they have not been put to commercial use.

U.S. Pat. Nos. 5,351,555 and 5,465,627 also give attention to the need to confine the circumferential field within the ring. If the shaft to which the ring is fitted is of low permeability (i.e. paramagnetic), the magnetised transducer ring can be mounted directly to the shaft. However, if the shaft is of high permeability, e.g. ferromagnetic, it is proposed to mount a low permeability spacer between the ring and the shaft. The consideration underlying these proposals appears to be that if the circumferentially magnetised ring were to be mounted directly to a mass of high permeability material, the flux that emanates from the ring under torque would be shunted through the shaft and no useful flux would be available emanating from the ring.

In practice the ring is made with a thin wall thickness, typically 1 mm. for a 20 mm. diameter ring. In order to be pressed onto the shaft and to deal with high torque loads on the shaft, making the ring as thin as possible is advantageous but this has to be balanced against the magnetic field output becoming weaker as the ring becomes thinner. Anothr cost factor to be considered is the need to produce the ring by maching and any special measures taken on the shaft and/or ring to secure the ring against slippage under torque loads add to cost.

U.S. Pat. No. 5,520,059 adds to the disclosure of the two patents discussed above, the concept of the ring transducer having two axially-adjacent zones each having a circumferential magnetisation but the respective magnetisations being of opposite polarity, that is in opposite circumferential directions. More than two zones may be employed of alternating polarity of magnetisation.

There is also a suggestion in U.S. Pat. No. 5,520,059 that a tubular shaft, shown as thin-walled relative to the tube diameter, have a section of the tube itself magnetised to provide a transducer portion of the tube. Specifically the magnetised section has two adjacent zones of opposite polarity magnetisation. However, special measures are taken in this case by inserting a plug into the section of tubular shaft that is to provide the transducer in order to induce hoop stress into that section of the shaft. Furthermore, the magnetised zones should lie axially inward of the ends of the plug. The practical implementation of this proposal requires additional components, i.e. the plugs, and would be difficult to implement without damage and with accuracy of placement, which together with assembly time and entails additional costs.

It is also considered that to define the position of the magnetised region of the tube will probably require additional treatment of the tube adjacent the magnetised region, such as a heat treatment to render the adjacent regions less permeable.

In practice, the torque sensor arrangements of the transducer ring type which have been offered in the market place are of the kind which have a separate transducer ring requiring affixing to the shaft whose torque is to be measured.

The employment of a magnetic transducer element of the torque sensor arrangement in the form of a separate ring that is secured to the shaft such that the torque stresses in the shaft are communicated to the ring entails the following disadvantages:

1. Slippage of the magnetised ring under high torque conditions, impairing reliability;
2. The cost of the magnetised ring;
3. The high tooling cost and manufacturing cost associated with the ring.
4. The high cost associated with using a non-magnetisable material for the shaft. Most shafts, for most torque-transmitting applications, are made of steel which is magnetisable.
5. The high tooling and manufacturing costs associated with the shaft. The shaft needs to have splines, or to be tapered, or have some special tooling to prepare it for receiving the ring.
6. Limitations in the shape and form of the shaft.

SUMMARY OF THE INVENTION

The present invention is based on a new concept, namely to use the shaft itself as the magnetoelastic transducer element of a torque sensing arrangement. To this end at least a portion of the shaft itself is magnetised. The invention permits lower manufacturing costs and ease of use as compared with the prior ring transducer technology. The invention also introduces another new concept which is to measure the flexural force in an elongate member subject to a bending moment. For convenience all such elongate members, subject to torque and/or flexure, whether intended for rotation or not, will be referred to as "shafts".

It is a feature of the concept of the present invention that, contrary to prior thinking, the shaft is of a magnetisable material and is of a solid or substantially solid cross-section at the portion thereof which is to be magnetised. A substantially solid cross-section allows for example an axially-extending bore within the shaft but the bore cross-section being significantly smaller than that of the shaft so that there is a substantial greater thickness of magnetisable material in the cross-section of the magnetised portion than is occupied by the bore. This is acceptable because little of the magnetisation of a circumferentially magnetised shaft penetrates to the central region of the shaft. Typically, with a circular shaft and bore, the bore diameter will not exceed one-third of the shaft diameter. A similar ratio will apply to pertinent dimensions of shafts of non-circular cross-section.

Within the purview of this invention a "solid" shaft is to be understood as including a shaft that is solid to an extent substantial enough to satisfy the purposes of the present invention.

In the practice of the invention described below, it will be shown how the transducer portion of the shaft does not require any special treatment, e.g. the inducing of hoop stress or special surface treatment. The magnetised shaft portion is unitary with or integral with the shaft to each side of the magnetised portion in that it is of the same material as the adjoining portions of the shaft section of the shaft relevant to torque measurement, i.e. the shaft is homogeneous as regards its material. This is not to imply a specially high degree of uniformity in the material. It has, for example, been found that normal changes in alloy concentration as they occur in standard steel materials are fully acceptable. In practical engineering applications in many cases a torque transmission shaft is a single unitary object but it is possible to contemplate an overall transmission shaft that is composite in having two or more parts that may be of different characteristics as regards their material but, of course, including a magnetisable part treated in accordance with the present invention. It is a feature of embodiments of the invention to be described below that a shaft of magnetisable material can be circumferentially magnetised at a portion thereof, which may include two or more zones of opposite circumferential polarity in next adjacent zones.

Aspects and features of this invention for which protection is presently sought are set forth in the Claims following this description.

BRIEF DESCRIPTION OF THE DRAWINGS

The invention will be more fully understood by reference to the detailed description below, which should be read in conjunction with the accompanying drawings, in which:

FIGS. 8c and 8d are similar to FIGS. 8a and 8b with a more extensive solenoid arrangement.

FIGS. 11a, 11b and 11c show diagrammatically a magnetic field sensor employing multiple coils being used to cancel out the effects of external magnetic fields while continuing to sense the torque or force signal from a magnetised shaft, FIGS. 11a and 11b showing one pair of magnetic field sensing coils being used, while FIG. 11c shows two pairs for cancelling out the effects of shaft movement.

FIG. 13b shows a modification of the embodiment of FIG. 13a;

FIG. 13c shows a further modification of the embodiment of FIG. 13a;

THE PREFERRED EMBODIMENTS

Figure 1A:
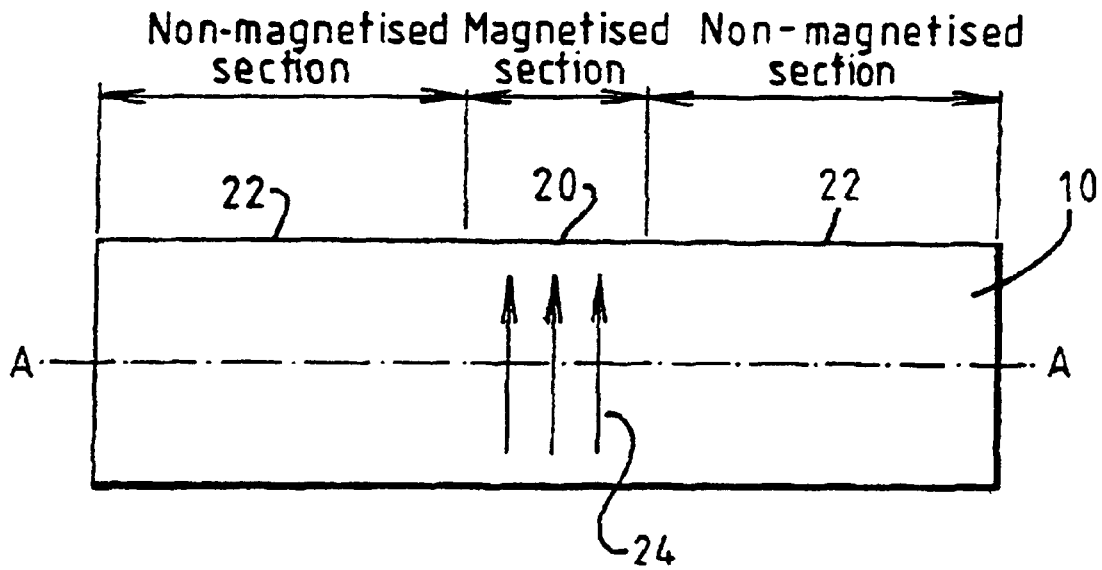
FIGS. 1a and 1b show a 2-dimensional and a 3-dimensional representation of a shaft that has been magnetised, the magnetic field flowing around the circumference of the shaft and the shaft is shown in a torque-free state.
Figure 1B:
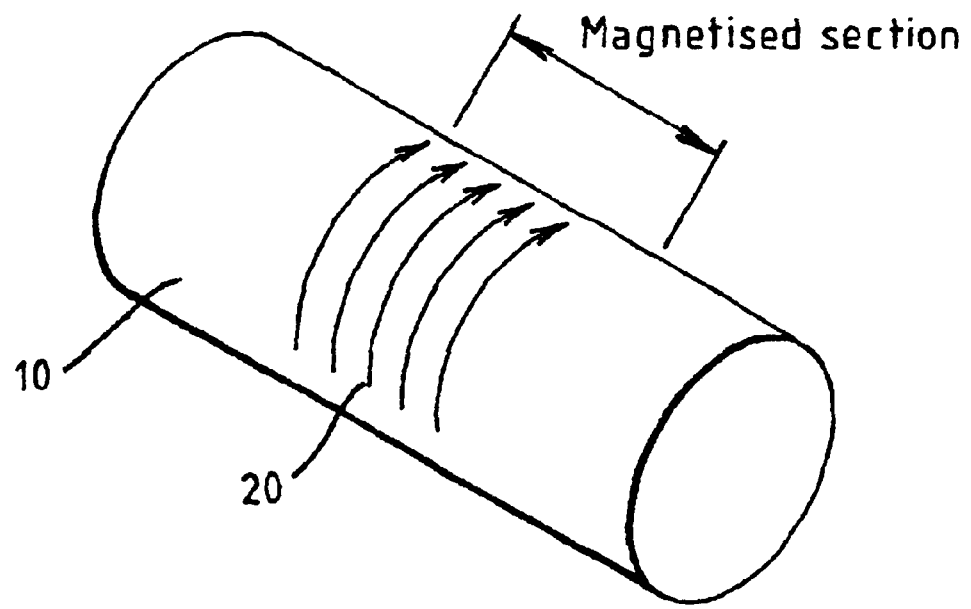

FIGS. 1a and 1b illustrate a shaft 10 of solid circular cylindrical cross-section rotatable about its longitudinal axis A—A. The shaft is of a magnetisable material. The shaft is assumed to be stationary and to have no torque applied to it about the axis of rotation. The shaft has an axially inner magnetised portion 20 bounded by outer non-magnetised portions 22. Thus as shown in the figures, the shaft 10 is a single homogeneous entity with the magnetised portion integral with or unitary with the remainder of the shaft. The magnetic field 24 extends circumferentially around the inner portion 20 and the flux is confined to the shaft. That is no flux lines emanate externally of the shaft in the absence of stress in the shaft. Within the solid shaft, the circumferential field can be visualised as penetrating inwardly like a series of concentric rings, the field getting weaker toward the centre of the shaft and vanishing at the axis. Thus the presence of a bore running through the axial core of the shaft has no practical consequence magnetically. FIGS. 1a and 1b illustrate the concept of establishing the magnetic field within the shaft itself, the magnetised portion having a solid cross-section. In the quiescent, non-torqued, state of FIGS. 1a and 1b, essentially no field is present externally of the shaft. No special mechanical measures need be taken in preparing the shaft for magnetisation.

Figure 2A:
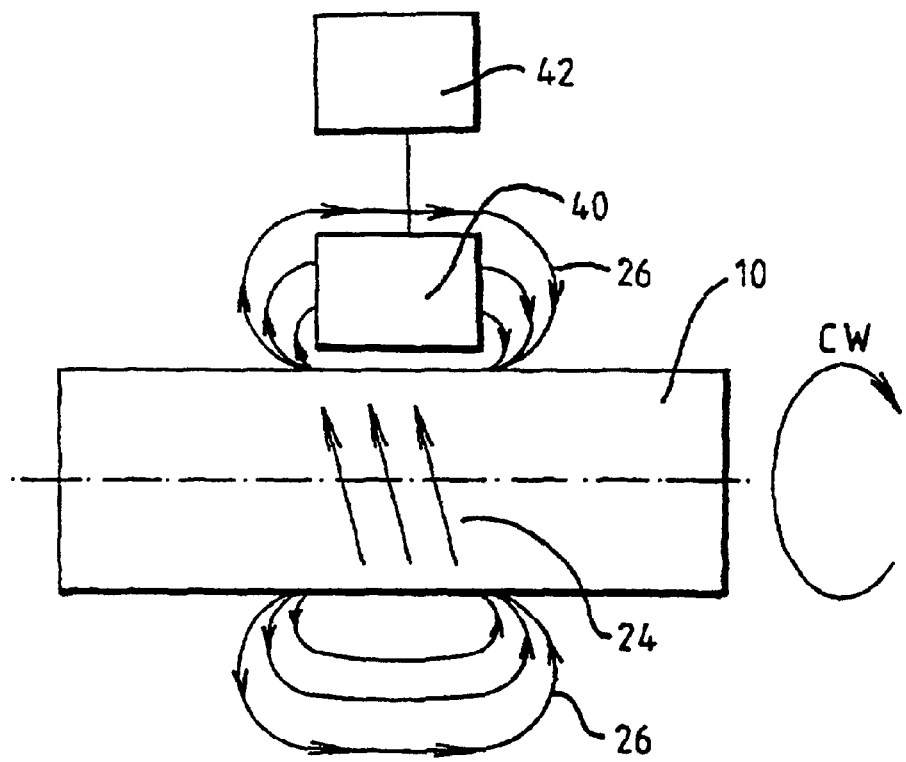
FIGS. 2a and 2b show the shaft of FIG. 1a, with torque applied in a clockwise direction and in an anti-clockwise direction respectively at the right-hand end of the shaft.
Figure 2B:
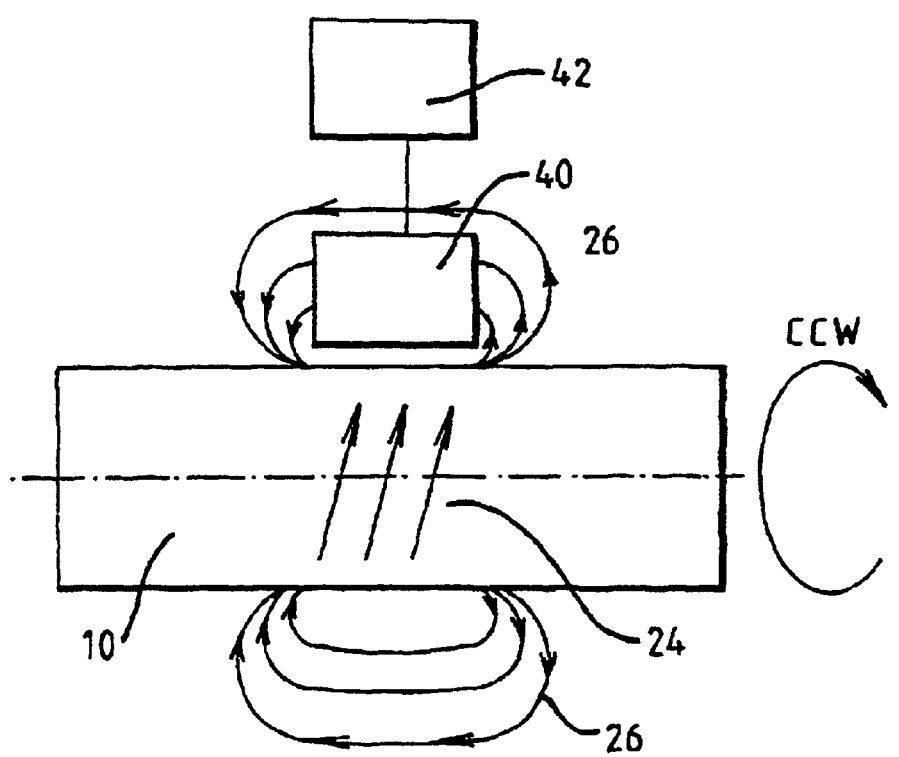

FIGS. 2a and 2b show the shaft 10 rotating under a torque applied at the right-hand end to drive a load (not shown) coupled to the other end. The torque is clockwise (cw) in FIGS. 3a and counterclockwise (ccw) in FIG. 3b. As is known in the prior magnetic ring practice, the circumferential magnetic field 24 distorts in one or other direction dependent on the direction of the torque-induced stress. The shaft need not be continuously rotating. It may be fixed at its left-hand end with a torque applied at the other end. A consequence of the field distortion is that field lines 26 emanate or escape from the magnetised section of the shaft, in the case illustrated forming a magnetic torus or doughnut about the shaft 10. The magnetic flux 26 external to the shaft is proportional to the torque and its magnitude and, if required, direction can be detected by one or more sensing element(s) 40 to derive by means of appropriate drive and/or processing circuitry 42 an output which is a measure of the torque in the shaft. It should be noted that the direction (sense) of the emanated field for a given direction of circumferential field and torque is different for different materials. For a shaft of a given material the sense of the emanated field for a given sense of torque remains the same and the magnitude of the emanated field as a function of torque is linear and repeatable within elastic limits. The complete sensor arrangement, involving the use of sensing element(s), non-contacting for a rotating shaft, and the associated circuitry may be of any appropriate design, such as the examples mentioned above for cooperation with a separate transducer ring. The effectiveness of using the field 24 as a transducer field is greatly enhanced by the use of adjoining guard fields as will be described subsequently.

The foregoing assumes a case where the external magnetic flux is zero in the absence of torque stress. If there is a quiescent flux this can be compensated in the external sensor. It will be appreciated the shaft 10 or at least the magnetised section 20 should be of a material that exhibits magnetoelasticity, conveniently referred to as a magnetoelastic material, so that the desired magnetic field can be established in the shaft. The manner in which this can be done is discussed further below. It is worth mentioning that experience to date shows that for long term stability of the magnetic field, it is preferable to employ a magnetisation that forms a closed loop within the material, such as the circumferential magnetisation already discussed. It is a characteristic of such closed loop fields that there is no or very little external field detectable.

As the torque increases, the magnetic field flux 26 escaping from the confines of the shaft 10 varies. There is a predictable relationship between the torque applied and the amount of magnetic field emanating from the shaft. In practice that relationship can be made linear. In the example shown in FIGS. 1a–2b, where the magnetic field is circumferential and essentially zero magnetic field emanates from the shaft under no-torque conditions, the magnetic field emanating from the shaft will increase with increasing torque. This characteristic will continue until the shaft material reaches its elastic limit. Therefore, the amount of magnetic field detected by the magnetic field detector 40 in FIGS. 2a and 2b has a direct relationship to the amount of torque applied to the shaft.

It is not essential that the magnetic field be a closed loop within the material and remains within the shaft under no torque or no force conditions. The magnetic field in an unstressed shaft can have any orientation or direction. The magnetic field that emanates from the shaft will vary in strength when mechanical stress (e.g. torque or bending) is applied and have a direction dependent on the applied torque or force. The bending or flexural case is described later. If the shaft has passed its elastic limit, the magnetic field emanating from it no longer has a linear and predictable relationship with the amount of torque being applied to the shaft.

It has been shown that a torque sensor can be developed using any shaft that is wholly or partially magnetoelastic, and whose magnetoelastic portion has been magnetised, in conjunction with a magnetic field detector. A torque sensor arrangement embodying the invention is based on the use of a magnetised shaft together with magnetic field detectors to create a torque sensing system, or torque sensor.

Figure 3A:
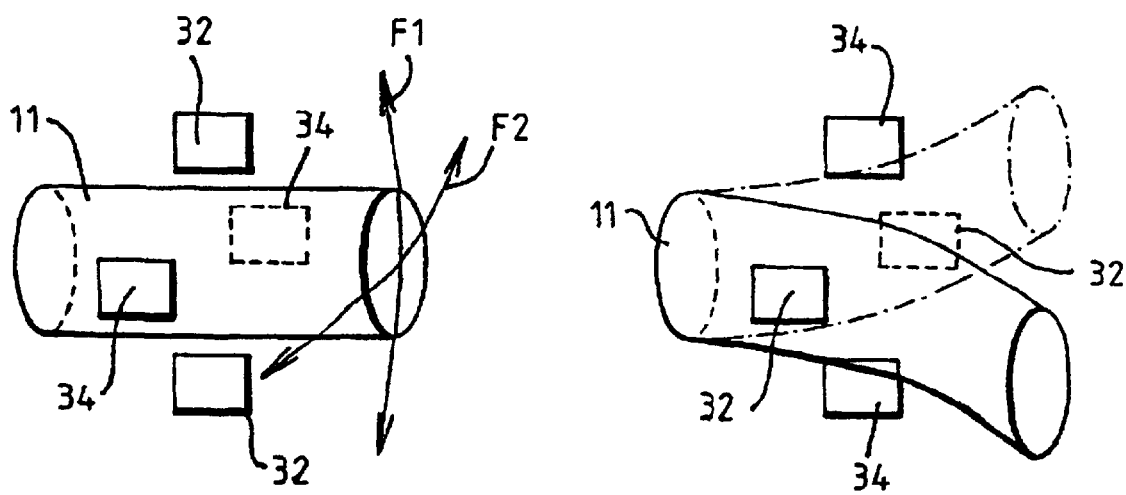
FIG. 3a shows a diagrammatic representation of an embodiment of the invention for measuring a bending force.
Figure 3B:
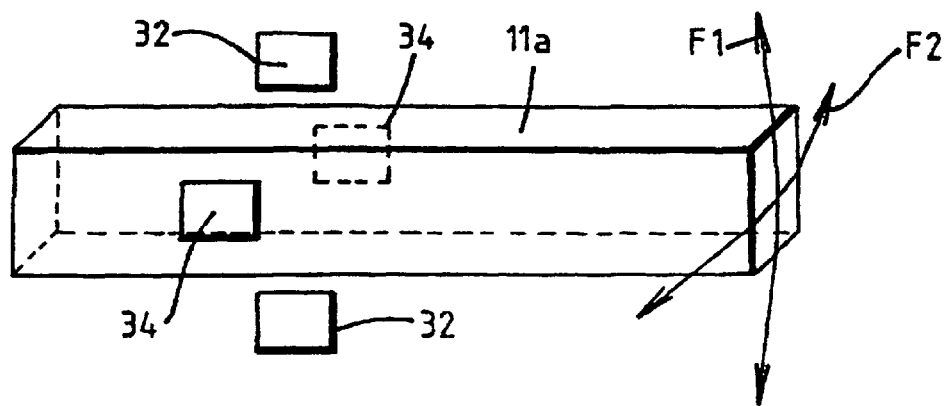
FIG. 3b shows the use of a shaft of different section.

Similar principles have been found to apply in the case of bending or flexure of a shaft. A variation in the magnetic field external to the shaft 10 also occurs in proportion to the flexing of the shaft. This effect can be employed more generally in a force or bending moment sensor. FIG. 3a (left) shows a shaft 11 that has been magnetised. The field is not shown. As an external force F1 or F2 transverse to the axis bends the shaft as shown exaggerated in FIG. 3a (right), the magnetic field emanating from the shaft varies predictably from its no-force state. A magnetic field detector (or multiple magnetic field detectors such as 32, 34) can be used to sense this change in magnetic field and can be used to measure the amount of force being applied to the shaft. FIG. 3b shows a shaft 11 with a different cross-section being used as a force sensor. It will be understood that in this context the shaft need not be used to transmit or act under torque but that this technique is applicable with any elongate member that is magnetisable or has a magnetisable portion and that is subject to flexing in response to an applied force generating a bending moment.

Referring further to FIG. 3a at the left, the shaft 11 is subject at one end to a force F1 or F2 transverse to the axis to cause the shaft to flex or bend with respect to its other end. The whole shaft or at least a portion of it is magnetised. While circumferential magnetisation could be used it is preferred in this case to use an axially-directed field in the shaft or a field across the shaft. The sensor pairs 32a and 34b mounted orthogonally with respect to the shaft, adjacent the magnetised portion where appropriate, detect the magnetic flux emanating externally to the shaft as a function of the bending moment. The flexed shaft is shown (greatly exaggerated in FIG. 3a at the right). F1 and F2 are shown as orthogonal and may be the orthogonally resolved components of a force applied in any transverse direction.

If interest lies only in measuring a bending moment resulting from a force in a given direction, e.g. that of F1, then the sensor pair, e.g. 32a, is placed to align with that direction.

Various specific examples are given herein of the direction of magnetisation for force or torque measurement. As far as has presently been investigated, it appears to be generally true that as long as the deformation that an applied force or torque causes and the field inside the magnetoelastic material are not wholly parallel or perpendicular, then the flux emanating from the material will vary predictably with the deformation and thus with the applied torque or force within the elastic limits of the material. The examples specifically described herein provide that the predictable variation is linear.

Thus in summary for both torque and bending force measurement, the shaft or a relevant portion of it can be made from any material that exhibits magnetoelasticity. The shaft can be of any size, shape or dimension such that it deforms rotationally when torque is applied to it (in the case of a torque sensing application) or deforms linearly when force is applied to it (in the case of a force sensor). The shaft may be heat-treated or not and its cross-section may be round, triangular, square or any other shape, including irregular. The shaft does not need to have the same cross section along its whole length. Investigation has shown that where mechanical strength is required, magnetisable steels (including Nickel ranging from 0.2% to about 18%, and optionally Cobalt) seem to exhibit good magnetoelastic properties.

In use as a torque sensor, the shaft may remain static or it may rotate, i.e. it may make more than one complete revolution as a result of the torque being applied, or it may make less than one complete revolution—the angular deflection induced rotation may be extremely small if one end of the shaft is fixed—as a result of the torque being applied to it. The magnetic field that emanates from the shaft when torque is applied varies from the no torque condition. This characteristic is true in both static and rotational situations, and the attendant magnetic field detectors can therefore detect the variation in magnetic field in either static or rotational circumstances.

Referring to the torque measurement case, torque may be applied to the shaft in a clockwise or in an anti-clockwise direction as shown in FIG. 2a and FIG. 2b. The magnetic field 24 within the shaft 10 bends towards the left-hand end of the shaft when clockwise torque is being applied (see FIG. 2b). The magnetic field 24 within the shaft 10 bends towards the right-hand end of the shaft when anti-clockwise torque is being applied (see FIG. 2b). It can be seen that the direction of the magnetic field 26 emanating from the shaft is dependent on the direction of the torque being applied to the shaft.

The magnetic field detector(s) are positioned to detect the direction (a function of the direction of the applied torque—FIGS. 3a and 3b) and the magnitude of the magnetic flux lines, i.e. the magnetic signal vector. The direction of the field 26 may not need detection in some circumstances. Magnetic field detectors that are not positioned to detect the direction of the magnetic flux lines only detect the magnitude of the magnetic flux.

Note that, for a wide range of torque measurements, the magnetic field orientation in the shaft can be set up in virtually any direction in relation to the axis of the shaft. However, for rotational torque measurement, the best results are achieved when the magnetic field under no-torque conditions is either parallel to the axis of the shaft or arranged circumferentially around the axis of the shaft. So far only circumferential magnetisation has been illustrated. The examples given below of inducing magnetisation in the shaft concern both these magnetic field orientations, although the theory applies equally to magnetic fields with different orientations.

The discussion of torque and bending force measurement with reference to FIGS. 1a to 3b assume the shaft has been magnetised with one circumferential magnetic field. A torque sensor and a force sensor have been demonstrated with one circumferential magnetic field. It can be shown that more controllable measurement results with more than one circumferential magnetic field. One, two, three or four magnetic fields have been demonstrated and larger numbers of magnetic fields can also be used. Multiple fields are preferred for a variety of reasons:

i) Assisting in cancelling out external fields.

ii) Improving the amount of magnetic signal emanating from the shaft.

iii) As "guard" and "keeper" fields. This is analogous to the keeper on a horseshoe magnet. A horseshoe magnet will keep its field longer if the keeper is kept in place and we have induced extra fields in order to "keep" the signal fields.

iv) The "guard" and "keeper" fields also reduce possible effects from unwanted magnetic fields remaining in the shaft. The "guard" and "keeper" fields on each side of a transducer field region act as a magnetic field blockage.

Attention will now be given to the manner in which a shaft is magnetisable over its whole length or over a section of it. It is assumed that the shaft is solid or substantially so in the manner discussed above. It may of course be possible to have shafts which have been exteriorly plated or coated which does not affect the magnetoelastic performance of the shaft. For illustrative purposes, the circumferential magnetisation examples are directed to multiple fields of alternating polarity. The single polarity field previously discussed is thus the simplest of the examples to be described.

Figure 4A:
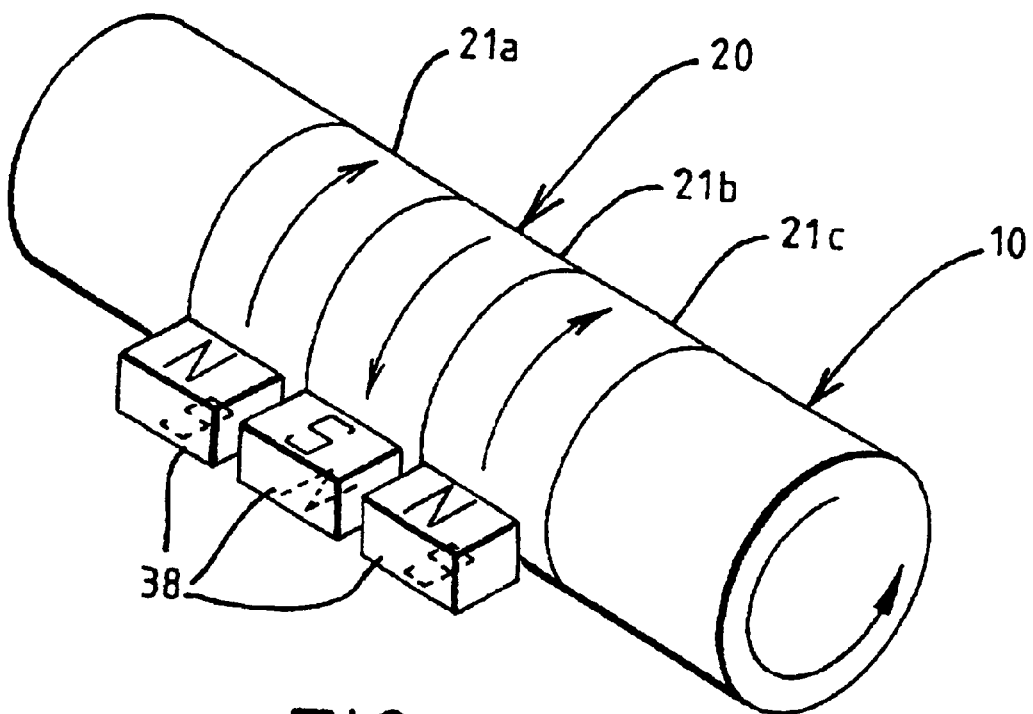
FIGS. 4a and 4b show how multiple circumferential magnetic fields are introduced into the magnetised section of the shaft with alternating polarities by use of external magnets.
Figure 4B:
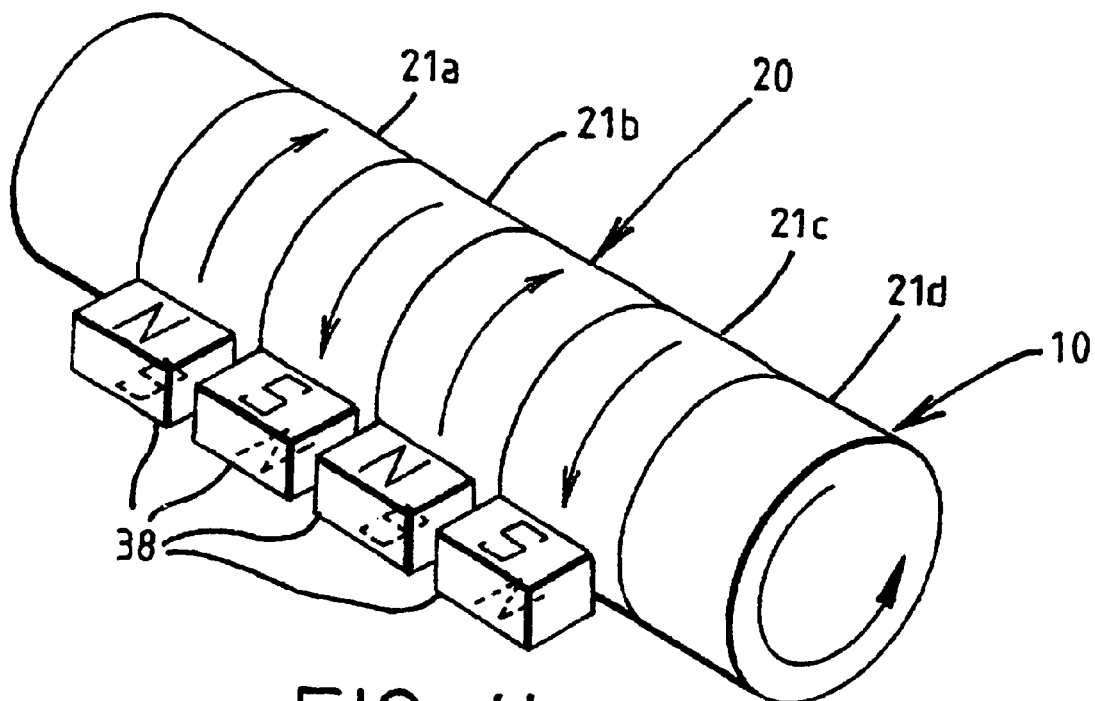

FIGS. 4a and 4b show examples of how multiple magnetic fields can be induced and arranged within a shaft. In FIG. 4a, three magnetic fields have been induced within the shaft 1 and in FIG. 4b four magnetic fields have been induced within the shaft 1. Examples of the practical use of three and four fields are described below with reference to FIGS. 12a and 12b. The shaft is shown as magnetised over a portion 20 divided into sub-sections 21a, b and c and 21a, b, c and d in FIGS. 4a and 4b respectively. Adjacent sub-sections have opposite polarity. The lines delineating the sub-section are notional.

Figure 4C:
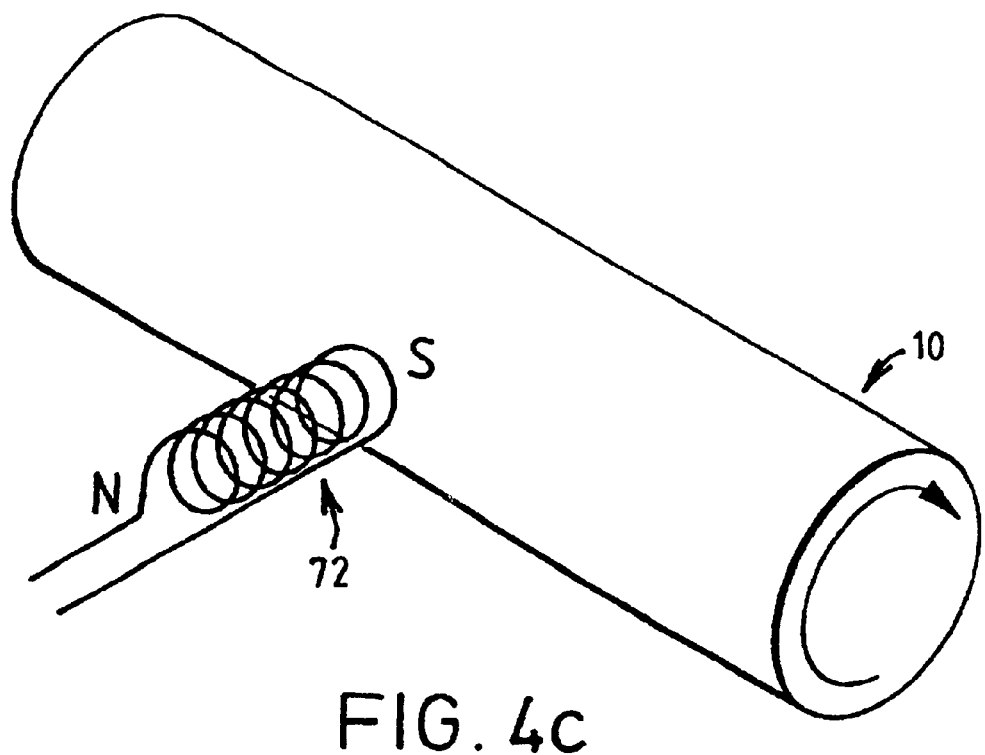
FIGS. 4c and 4d shows how a magnetic field can be set up in a shaft by bringing a current carrying coil, i.e. a radially disposed electromagnet, up to the shaft while the shaft is rotating.
Figure 4D:
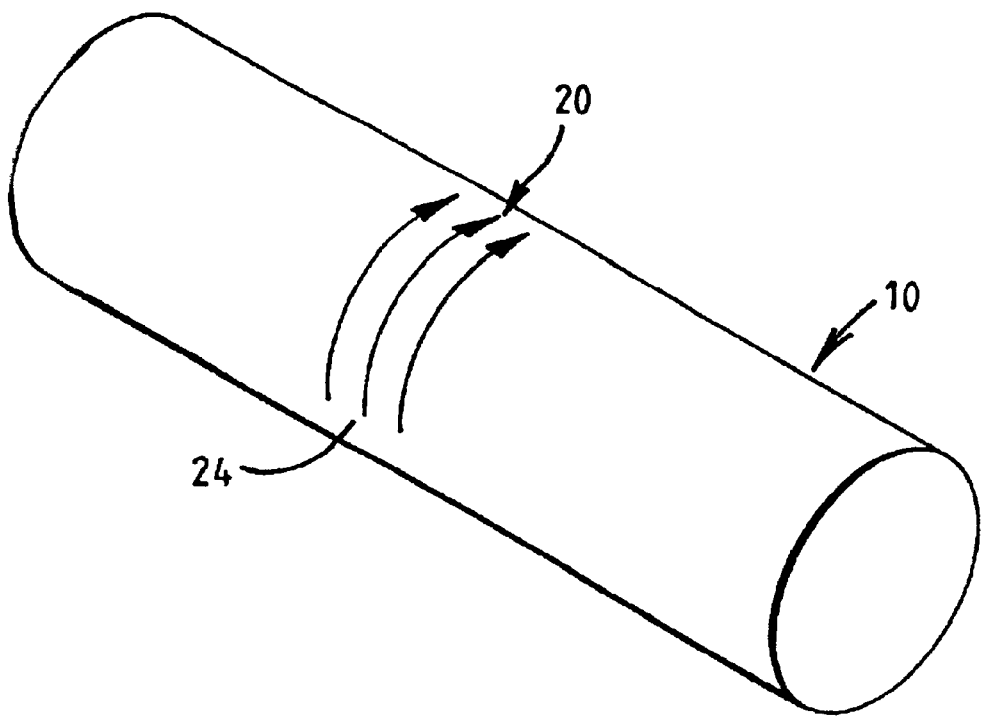
Figure 4E:
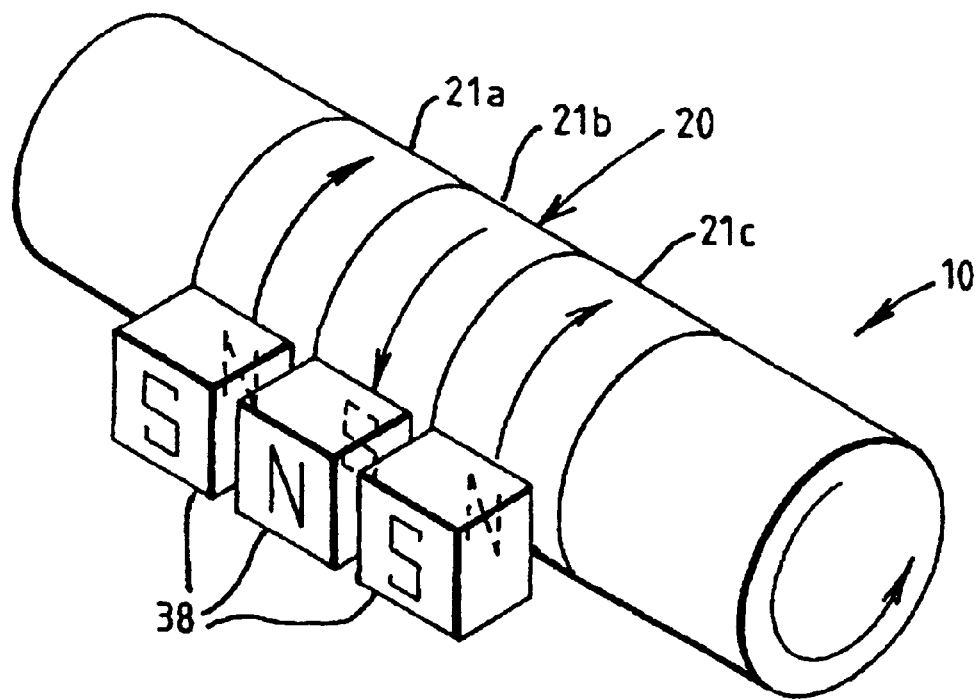
FIGS. 4e and 4f are similar to FIGS. 4a and 4b respectively but use different orientations of the external magnets.
Figure 4F:
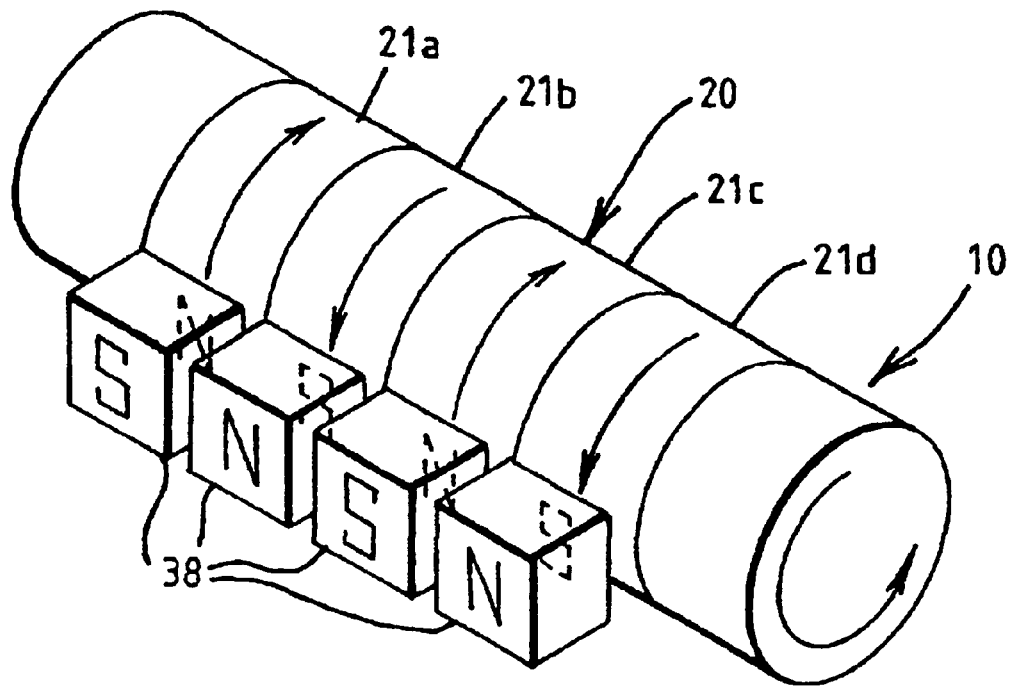

Each sub-section is magnetised by rotating the shaft about its axis A—A with respect to a respective permanent magnet 38 or an electromagnet system 39 with pole pieces placed to give the equivalent effect (FIGS. 4c and 4d) The N-S direction of each magnet is in the circumferential direction of the shaft, the magnet being placed closely adjacent the shaft. The polarity of the magnet in the circumferential direction is selected in accordance with the required polarity of the field induced in the shaft. FIGS. 4e and 4f show a similar arrangement but with the magnetic poles radial rather than circumferential. The method adopted has been to set the shaft rotating, bring the magnet or energised electromagnet up to the shaft while rotation continues, and then to move the magnet or electromagnet away from the still rotating shaft. The shaft is thus performing a number of rotations under the influence of the applied magnetic field in order to establish that field in the shaft.

The properties of the magnetic field induced in the shaft depend on several factors, including the following:

a) the direction of the external magnetic field, b) the strength of the external magnetic field c) the direction of rotation of the shaft, d) the speed with which the shaft rotates and e) the distance between the shaft and the magnetic field inducer (which could be a permanent magnet or a current carrying coil, for example).

The entire length of the shaft 10 and 11 (FIG. 3a) may be magnetised, or smaller sections of the length of the shaft may be magnetised. It is also possible to magnetise the whole length of the shaft first, followed by magnetisation of smaller sections of the shaft afterwards. In some instances degaussing of the shaft was performed prior to magnetisation, while in other cases no degaussing was carried out.

Figure 5A:
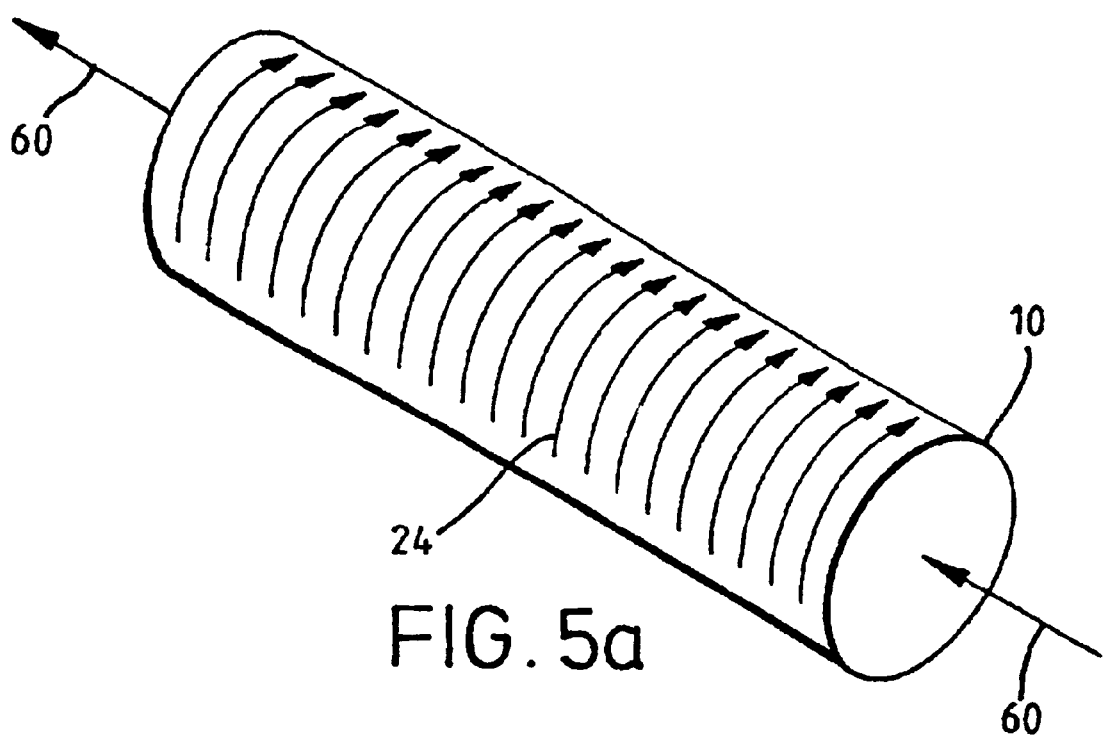
FIG. 5a shows the basic principle of how a magnetic field can be introduced into a shaft by passing a current directly through the shaft.
Figure 5B:
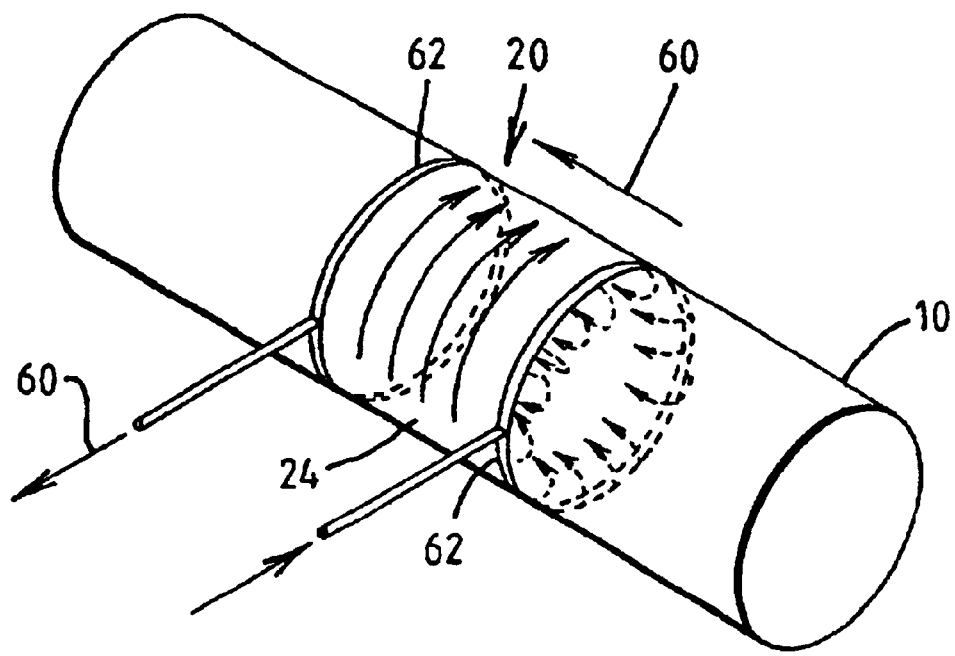
FIG. 5b shows the basic principle of how a magnetic field can be introduced into a shaft by passing a current directly through a portion of the shaft.

Circumferential magnetic field(s) 20, 21 have been introduced in a number of other ways, including the following;

1. Passing a direct current 60 longitudinally through the shaft 10 as shown in FIG. 5a. The current can be made to flow either through the whole shaft or through portions of it. While FIG. 5a shows the current 60 passing through an entire shaft, while FIG. 5b shows the current 60 passed through a portion 20 of the shaft. In the latter case the current 60 may be applied through ring electrodes 62 attached to the shaft. The resultant magnetic field 24 is circumferential. The direction of the field depends on the polarity of the current.

Figure 6A:
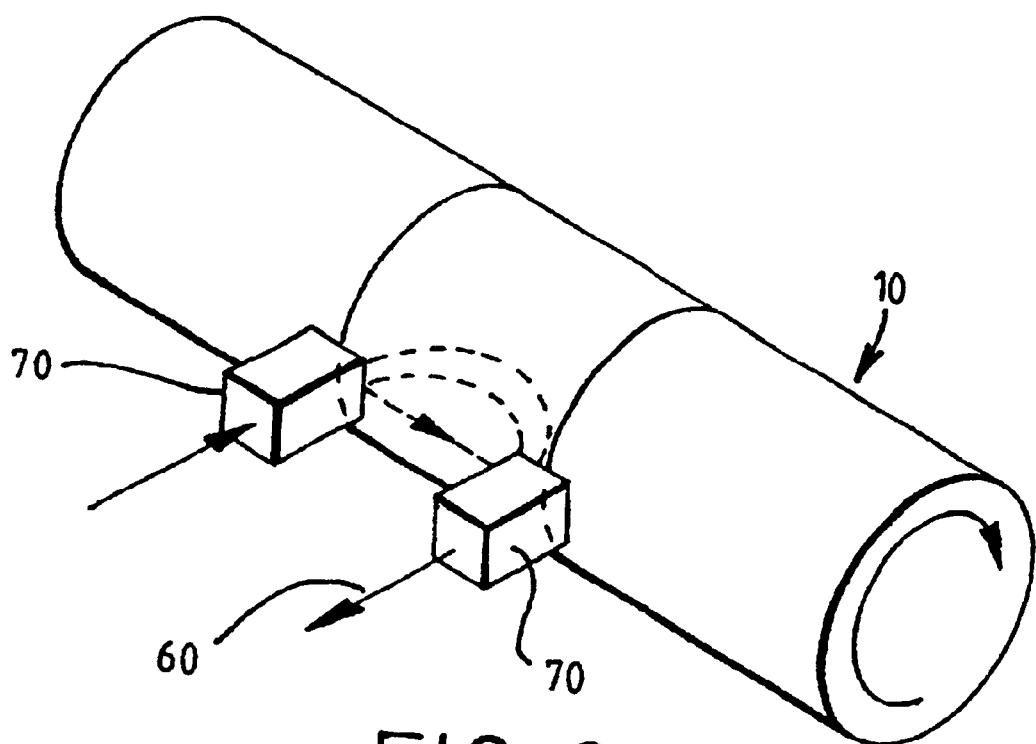
FIGS. 6a and 6b show respectively a current being introduced into a portion of a shaft while the shaft is rotating, by current carrying brushes or solid connectors, for example, and the resulting magnetic field that is set up in the shaft.
Figure 6B:
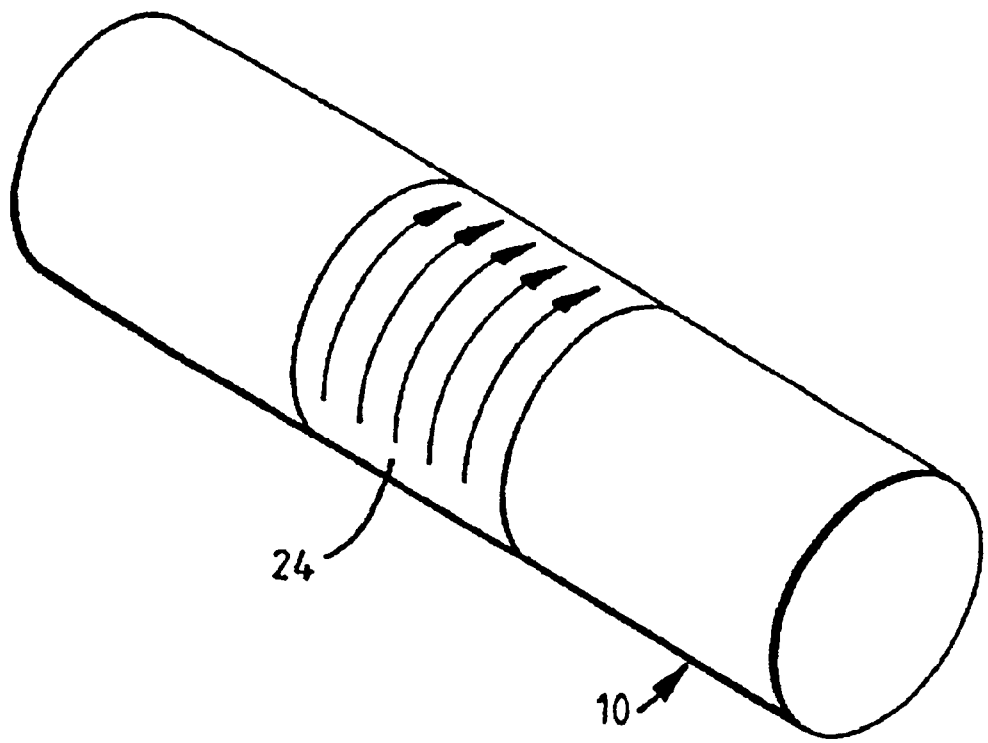

2. Passing a current 60 through the shaft 10 or a portion 20 of it while the shaft is rotating, as in FIG. 6a by means of conductive contacts 70, such as brushes or wheels engaging the periphery of the shaft. This produces a circumferential magnetisation 24 as seen in FIG. 6b.

3. Bringing permanent magnets up to the shaft 10 and then removing them away from the shaft while the shaft is rotating as in FIGS. 4a and 4b.

Figure 4G:
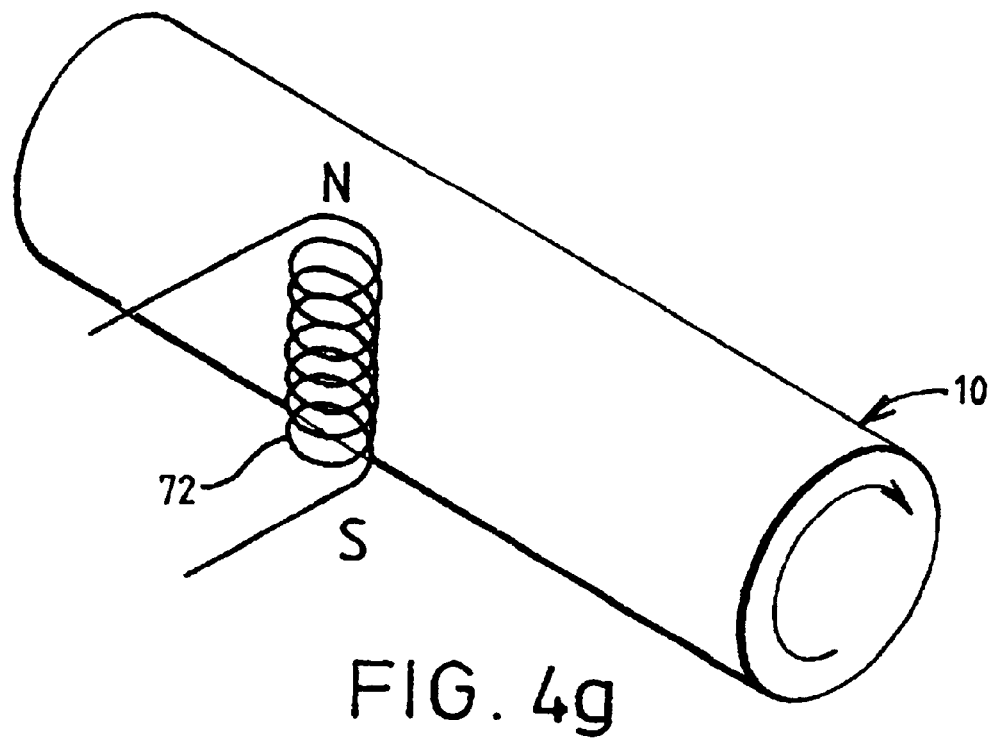
FIGS. 4g and 4h show a similar arrangement to FIGS. 4c and 4d but with the electromagnet coil circumferentially disposed rather than radially.
Figure 4H:
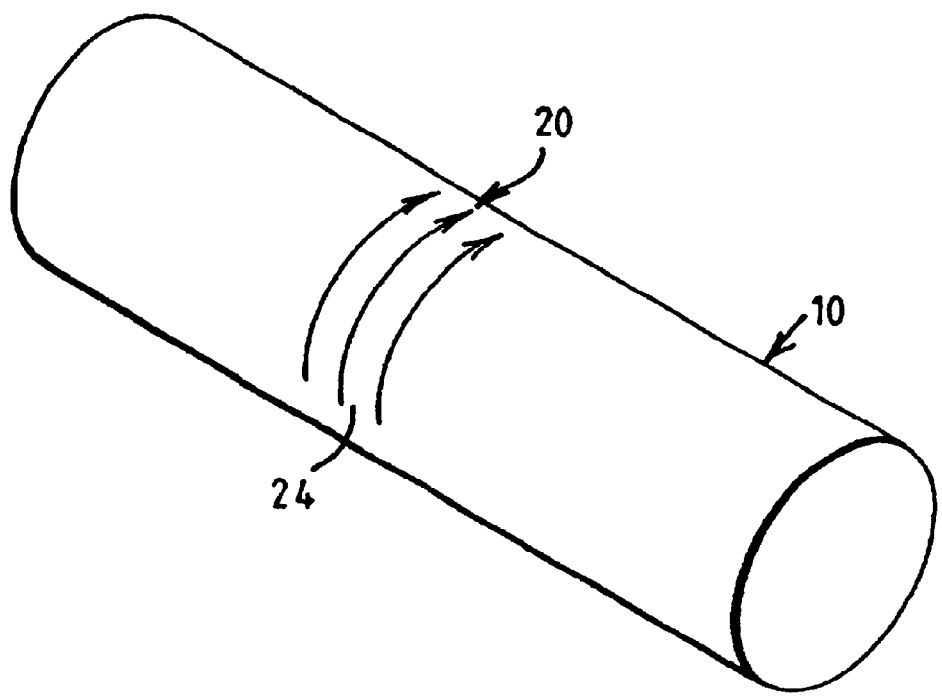

4. Bringing an electromagnet 72 up to the shaft and then moving them away, while the shaft is rotating, as shown in FIG. 4g to produce the circumferential magnetic field of FIG. 4h.

Figure 7A:
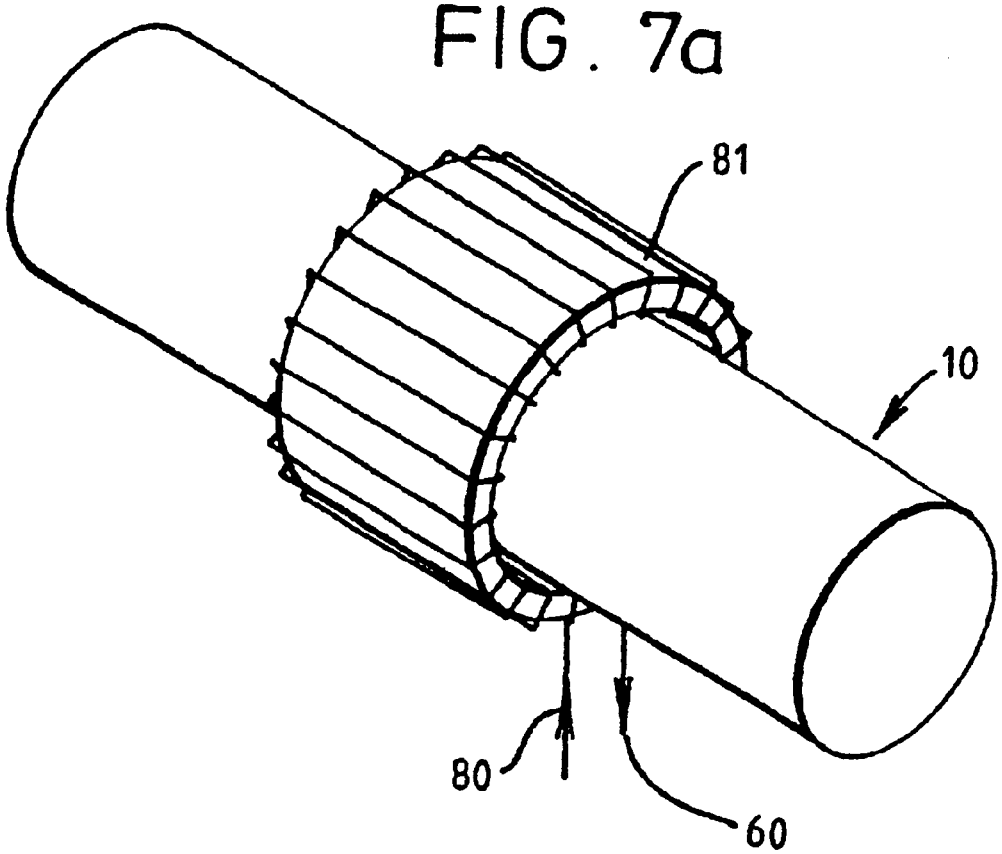
FIGS. 7a and 7b show how a magnetic field (FIG. 8b) can be set up in a shaft by passing a current through a wire wrapped toroidally around a hollow ring core and then holding the shaft in, or passing the shaft through, the centre of the core.
Figure 7B:
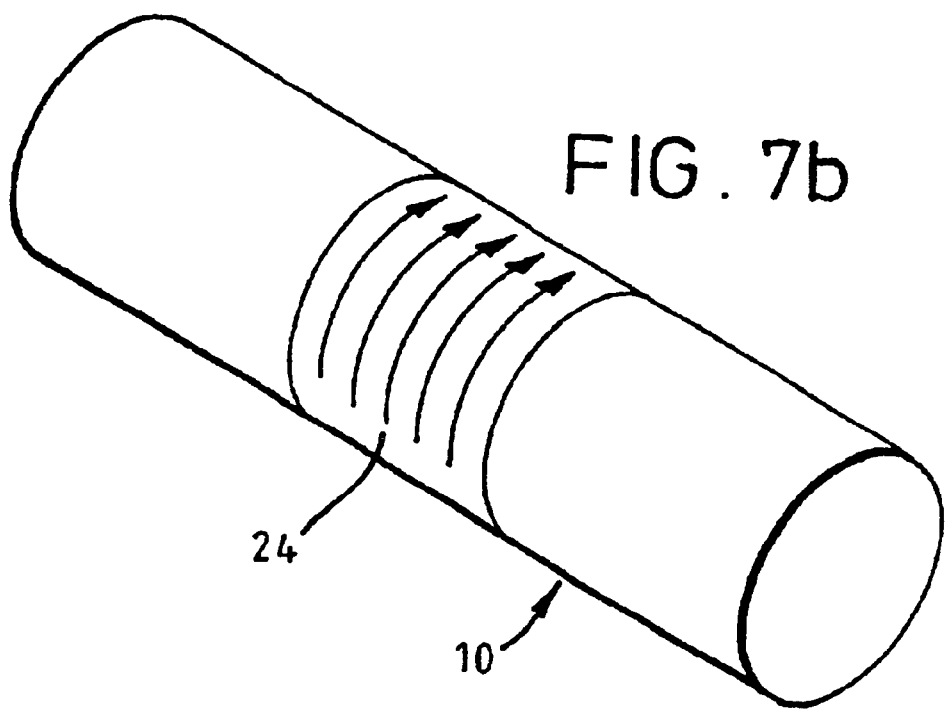

5. Passing a current 60 through a wire 80 wrapped toroidally around a hollow ferrite core 81 and holding the shaft 10 in, or passing the shaft through the centre of the core depending on the extent of the shaft to be magnetised, as shown in FIGS. 7a and 7b. In implementing the magnetising arrangement of FIG. 7a it is preferred to have a substantial radial depth to the ferrite core so that the field acting to magnetise the shaft is predominately from the portions of the coil turns closely adjacent the shaft and more particularly the portion of the field at the radially inner side of each turn. The turns should be as close packed as possible. This field is normal to the turns and in the same circumferential direction around the toroid.

Figure 14A:
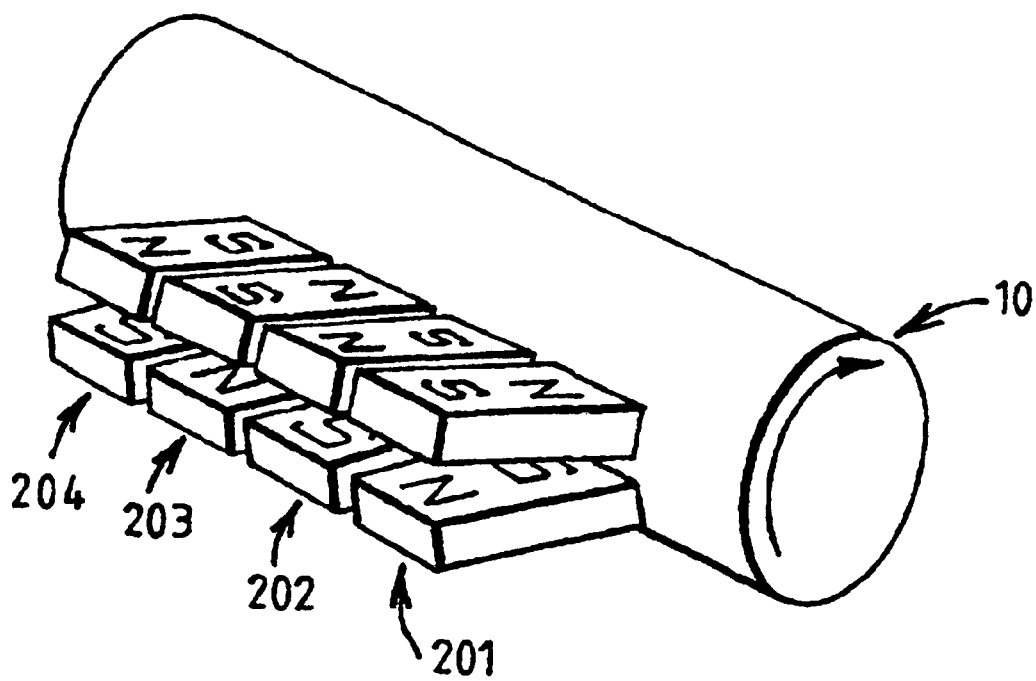
FIGS. 14a and 14b show another arrangement for magnetising a shaft to provide a plurality of circumferentially magnetised regions.
Figure 14B:
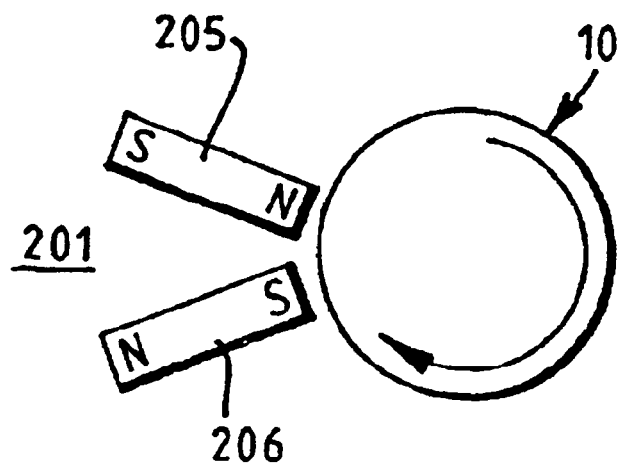

FIGS. 14a and 14b show another magnetising arrangement for the shaft 10 which involves relative movement between the shaft and the magnets. FIG. 14a shows one or more pairs 201, 202, 203, 204 of magnets arranged to axially cover the portion of the shaft to be magnetised. One pair, e.g. 201, is seen in FIG. 14b. The two magnets 205, 206 have ends of opposite polarity adjacent the shaft and are a little spaced to provide a field between these shaft-27 adjacent ends that is essentially circumferential at the part of the rotating shaft passing thereby. It will be appreciated the magnets can be of the permanent or electromagnet type.

FIG. 14a also shows how to produce two or more circumferential fields along the axis of selected polarity. In this example of FIG. 14a the magnet pairs are of opposite polarity with respect to the shaft in alternate pairs so that the arrangement of four pairs shown will produce four magetised regions of alternating direction of circumferential magnetisation.

The foregoing possibilities 1, 2 and 5 assume a conductive shaft at least over the relevant magnetisable portion.

Figure 8A:
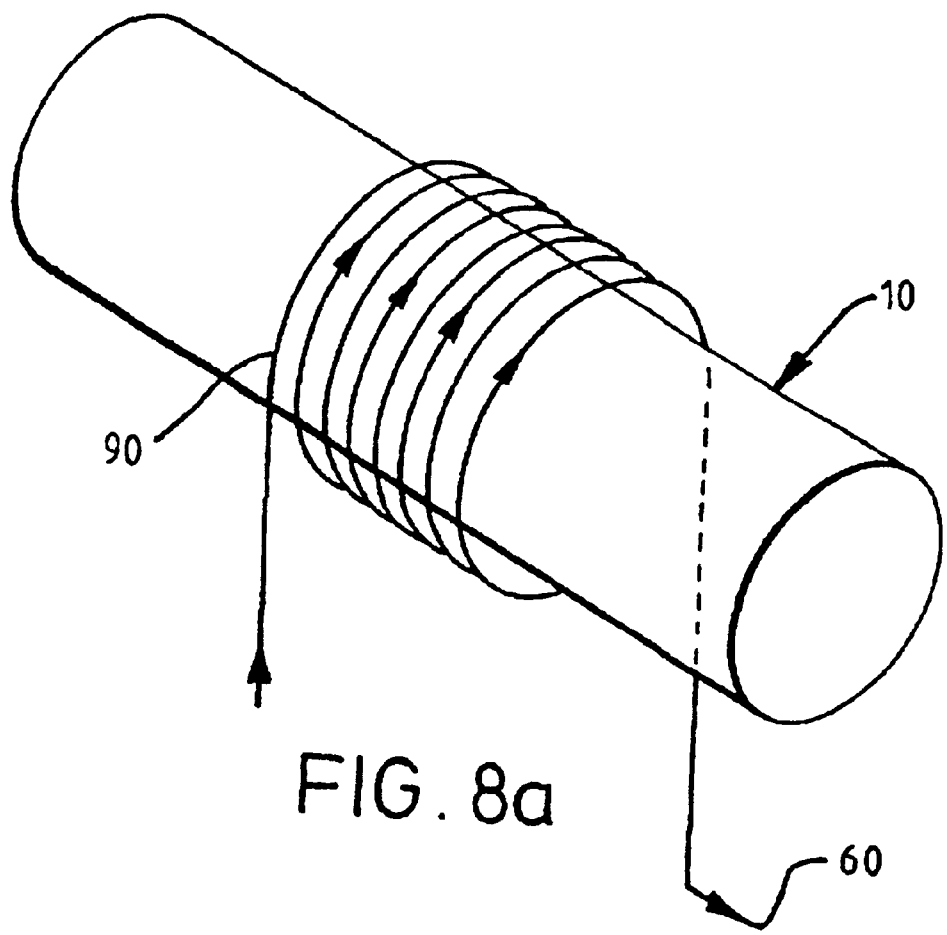
FIGS. 8a and 8b show how a longitudinal magnetic field (FIG. 8b) can be set up in a portion of a shaft by using the shaft as a core in a solenoid.
Figure 8B:
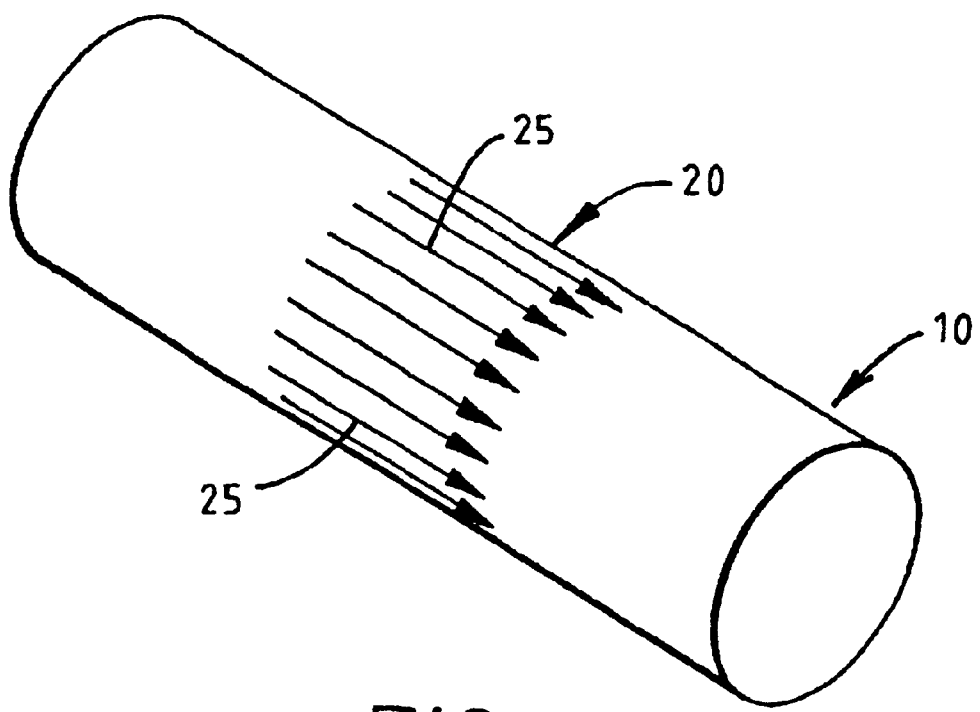
Figure 9A:
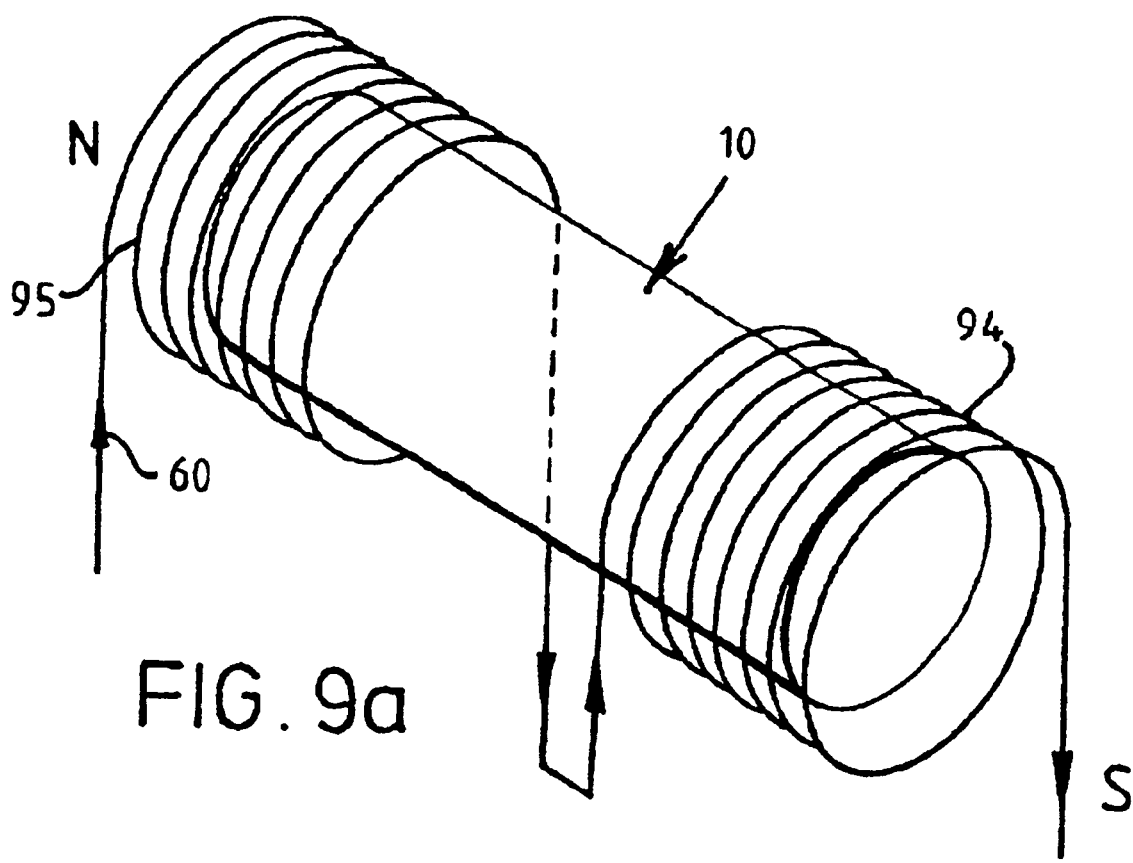
FIGS. 9a and 9b show how a homogenous magnetic field (FIG. 9b) can be set up in a shaft by holding the shaft between two spaced, current-carrying coils.
Figure 9B:
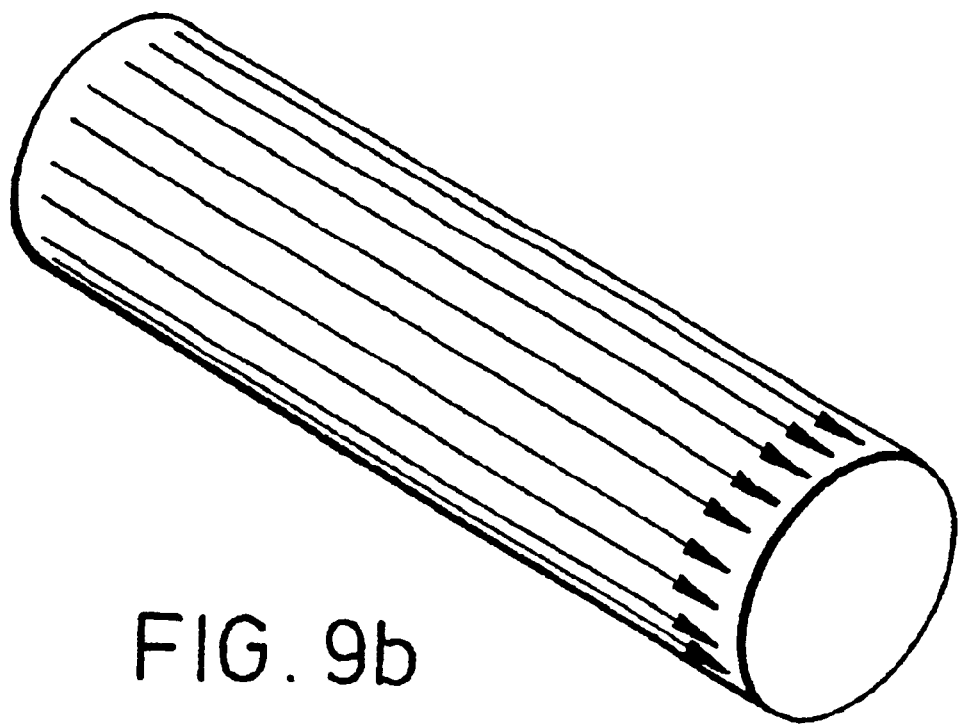

Axially oriented magnetic fields 12 can be introduced in the following ways:

1. Using the shaft 1 as a magnetisable core in a solenoid 90 as shown in FIG. 8a to produce the parallel longitudinal field 25 of FIG. 8b. Whereas FIGS. 8a and 8b show a portion of the core magnetised, FIGS. 8c and 8d illustrate magnetisation of the whole shaft. The solenoid 90 is energised with a direct current 60. p0 2. Referring to FIGS. 9a and 9b, by holding the shaft 1 between two current carrying coils 94 and 95 arranged on the same axis and spaced from one another and connected so that the North pole of one coil faces the South pole of the other. The lines of magnetic flux between the two coils flow directly and evenly from one coil to the other. Coils arranged thus are commonly referred to as Helmholz coils.

The methods shown in FIGS. 8a to 8d and 9a and 9b can be used to introduce a known, axially oriented magnetic field 25 to the shaft 1, so that the magnetic state of the shaft is known and understood. As previously discussed the axial field can be used directly in a torque or force sensor. It may also be used as a precursor to establishing a circumferential field. Axial magnetisation can be useful when a shaft of an unknown magnetic state is to be magnetised for use in a torque sensing system. Shafts may be of an unknown magnetic state because the processes employed in their manufacture, and the environments in which the shafts have been kept, can induce unknown, unpredictable and inhomogeneous magnetic fields within those shafts.

An alternative to introducing a known, axially oriented magnetic field into a shaft before introducing the circumferential magnetic fields that will be used magnetoelastically to detect torque being applied to the shaft, is to degauss the shaft. It is preferred to use a circumferential field for torque measurement. If established properly such a field will provide zero external field at no torque and in the presence of a torque the polarity of the emanated field will depend on the direction of the torque.

It is possible to calibrate automatically the magnetic field(s) being introduced to a shaft. This technique allows calibrated shafts to be used together with magnetic field detectors to provide consistent and repeatable torque sensors in mass production. It also enables the design, manufacture and use of standard sets of detecting systems. A detecting system may consist of a coil together with sensing circuitry, whereby one detecting system set can be used with a variety of different shafts. The shafts have magnetic fields introduced into them that are dependent on the torque that is to be applied to them in their eventual application, i.e. each of the shafts will be programmed to emanate the same magnitude or vector of magnetic field in its application regardless of:

1. the application in which the shaft is situated,
2. the material from which the shaft is made, and
3. the magnitude and direction of the torque being applied to the shaft, as long as the shaft does not exceed its elastic limit.

Automatically calibrating a shaft also ensures that the magnetic field emanating from the shaft when torque is applied is the same throughout the full 360° of the circumference of the magnetised region. This is important because the shaft may have defects in its composition which otherwise would result in changes in the strength of the magnetic field emanating at different locations around the shaft.

This automatic calibration of the shafts, which is expected to be especially valuable in mass production environments, is realised by:

1. Introducing a circumferential field into the shaft using one of the methods described above. The field should be lower than that eventually required in the application.
2. Applying a known torque to the shaft.
3. Measuring the magnetic field given out by the shaft, and then comparing that field with the nominal field expected for a typical shaft of the same material and dimensions, under the same, known test conditions.
4. Using the results of these tests to determine how much stronger the magnetic field needs to be in order that it accurately produces the correct amount of field required by the specific application. The correct amount of field can then be introduced using one of the methods described above.

This technique can be used on a shaft that has previously been degaussed or not, or on a shaft that has magnetised with a known axial magnetic field or not.

In a given application, all shafts should emanate the same magnetic field under the same conditions. But not all the shaft in that application will be identical, so they will not necessarily have the same field induced into them.

It is possible to take a shaft (which can be called a nominal shaft) and induce a field into it. A known amount of torque can then be applied, and the emanating field can be detected. Greater and greater fields can then be induced until the optimum field is established for that application.

In order to establish what field (strength) to induce in any particular shaft for that application (which can be called a production shaft), then the same initial field that was introduced into the nominal shaft should be introduced into the production shaft. When the field emanating from the production shaft under the known torque condition is compared with the nominal field, then it will be possible to determine what the final field that should be induced into the production shaft should be. In this way, all production shafts will emanate the same field under the same conditions even though they do not necessarily have the same field induced into them.

A complete torque sensor arrangement may use Hall effect devices, magnetometers, magnetoresistance devices or compasses for example. It is preferred to use saturated coil arrangements such as described in U.S. Pat. No. 5,124,648 mentioned above.

Coil sensors may use single or multiple inductive coils to detect the magnetic field emanating from the magnetised shaft—one, two, four and eight coils have been proposed. The coil(s) are driven to saturation in alternating polarities by an oscillating drive circuit. The precise points at which the coil, or coils, saturates, or saturate, depend on the magnetic field acting upon it, or them. Sensing circuitry detects those saturation points and outputs a signal dependent on them. A preferred signal conditioning circuit is described in published International Patent Application WO98/52063 (PCT/GB98/01357).

Figure 10A:
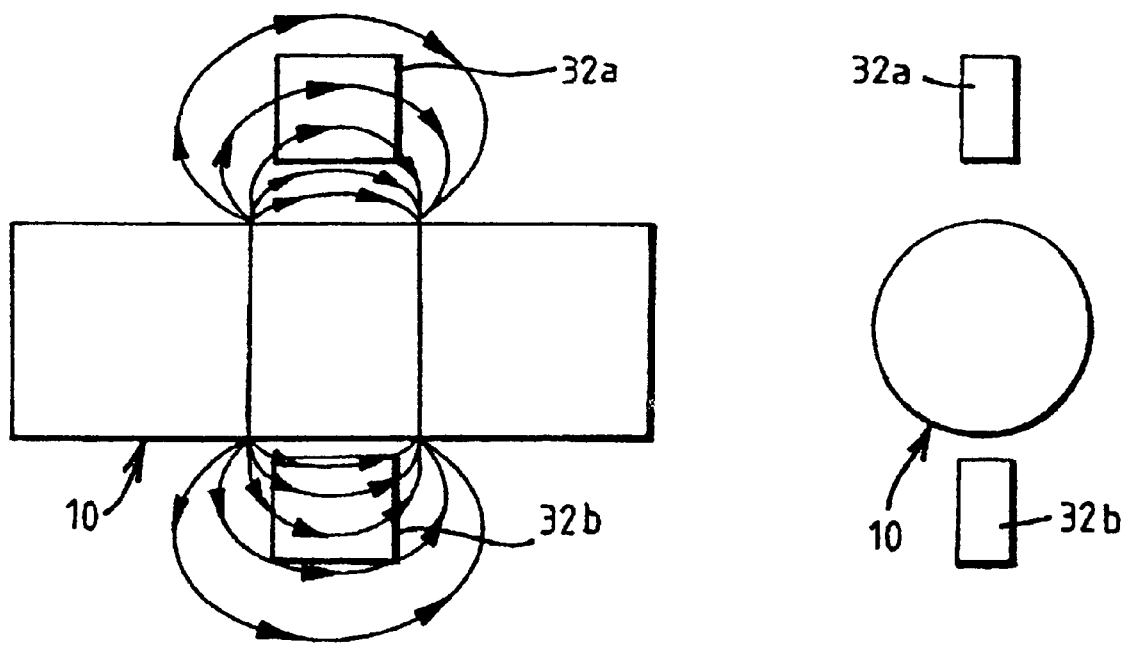
FIGS. 10a and 10b show a cross-section through the magnetised portion of a shaft together with a sensor arrangement, shown diagrammatically, the sensor arrangement comprising diametrically opposite sensor elements or pairs of sensor elements to compensate for movement or bowing of the shaft.
Figure 10B:
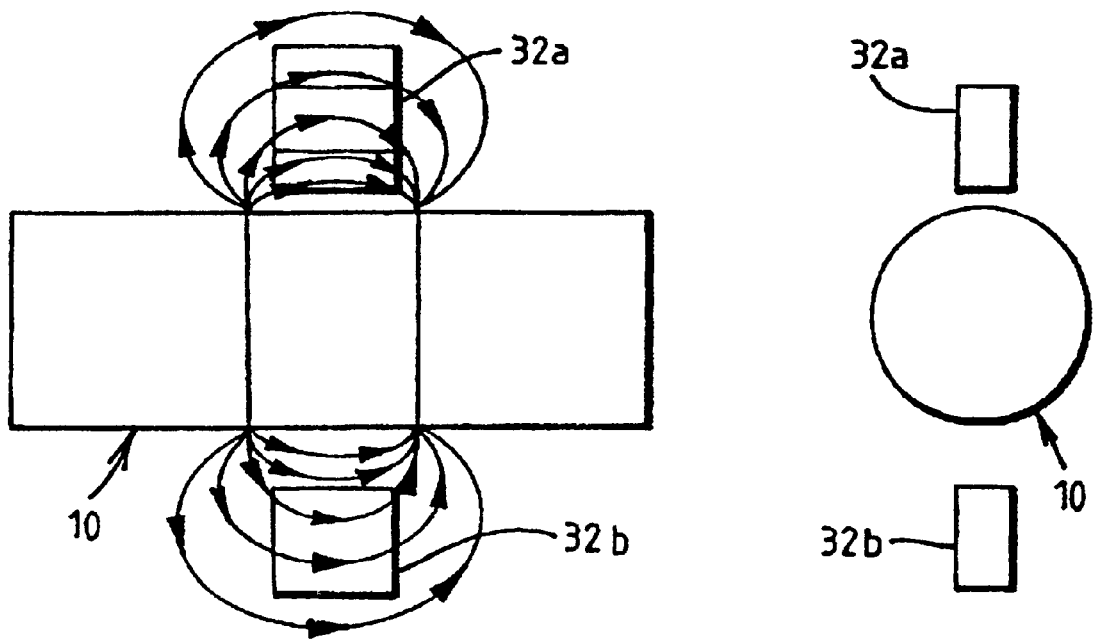

To compensate a bowing or transverse movement of a rotating shaft. FIGS. 10a and 10b illustrate a pair of diametrically opposite sensors or sets of sensors 32a, 32b whereby the resultant total flux measurement of both sensors or sensor sets compensates for movement of the shaft 10 toward one (FIG. 10a) or the other (FIG. 10b) sensor. A similar arrangement can be applied orthogonally to that shown. More than two sensing elements, or pairs of sensing elements, can be used. In the force sensing application of FIG. 3a, four sensing elements are arranged around a shaft and this can be extended to higher numbers as long as the elements, or pairs of elements, are arranged evenly around the shaft.

The use of multiple magnetic field sensors allows the system to measure accurately the torque applied to the shaft even if the shaft is exhibiting movements other than the rotational movement that torque application will necessarily induce. These shaft movements may be transverse to or axially of the axis of the shaft, or bowing of the shaft or may be some combination of these.

Figure 11A:
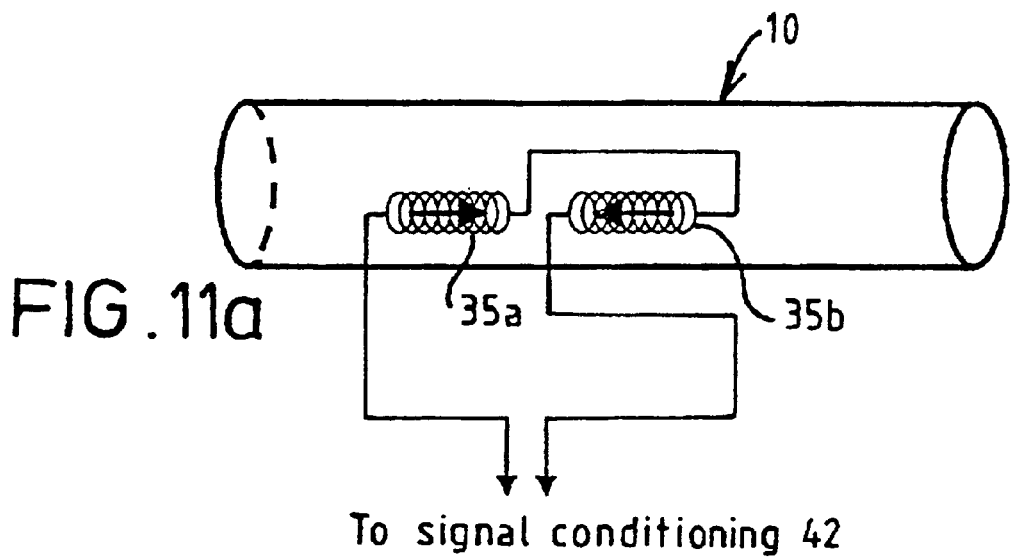
Figure 11B:
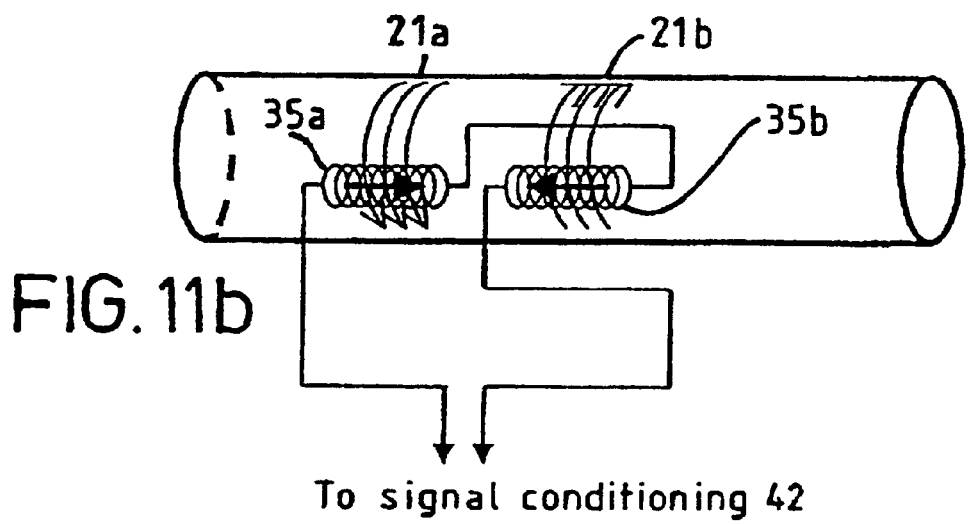
Figure 11C:
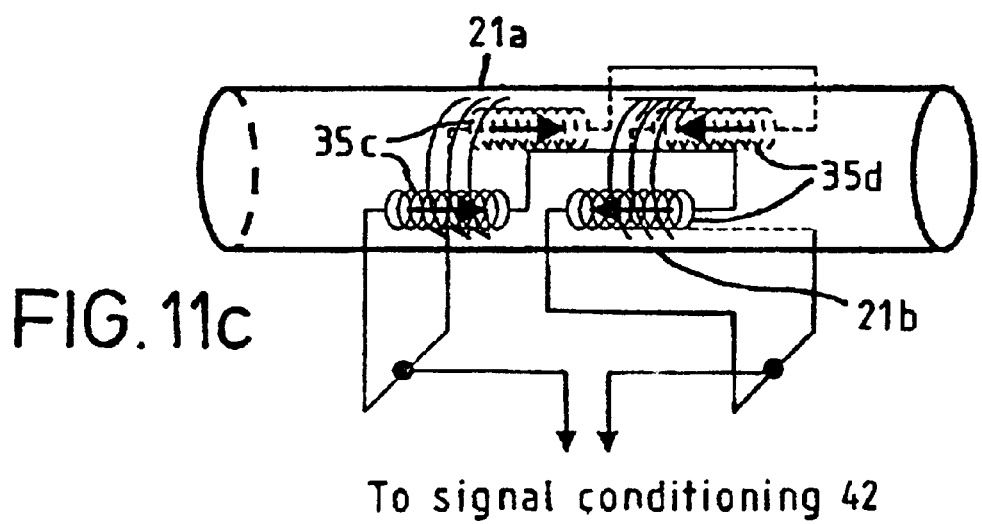

Multiple magnetic field detectors also allow the system to cancel out the effects of external magnetic fields such as the earth's magnetic field. These external magnetic fields can be constant or variable with time. External magnetic fields effectively add a positive offset to one detector, or set of detectors, and add a negative offset to another detector, or set of detectors. These two offsets then cancel each other out. FIG. 11a shows how two coil-type sensor elements 35a, 35b can be configured so that they can detect the magnetic signal emanating from the shaft while at the same time being juxtaposed such that any external magnetic field will affect them equally and oppositely. This arrangement normally requires that the shaft be magnetised with more than one magnetic field, a respective field cooperating with each coil. As torque or force is applied to the shaft, then the emanating magnetic fields that are directly proportional to the torque or force being applied need to have opposing polarities. FIG. 11b shows the example of how two fields of opposite polarity, e.g. 21a, 21b, and two coil field detectors can be arranged. FIG. 11c shows the same two fields, this time being detected by two pairs 35c, 35d of coil-type field detectors. This will allow external magnetic fields and any effects derived from movement of the shaft to be cancelled out, and the theory may be extended to the use of many pairs of detectors as described above. It is to be noted that the series interconnection of the sensing coils in FIGS. 11b and 11c is such that the voltages due to the sensed torque add (the voltages in the coils being of opposite polarity as seen), while voltages due to a common external field (which are of the same polarity as seen in the figure) will cancel.

The number of magnetic fields to be introduced into a shaft and the number of magnetic field detectors used to sense the magnetic field(s) emanating from the shaft will be application dependent and will be chosen on a case by case basis.

Figure 12A:
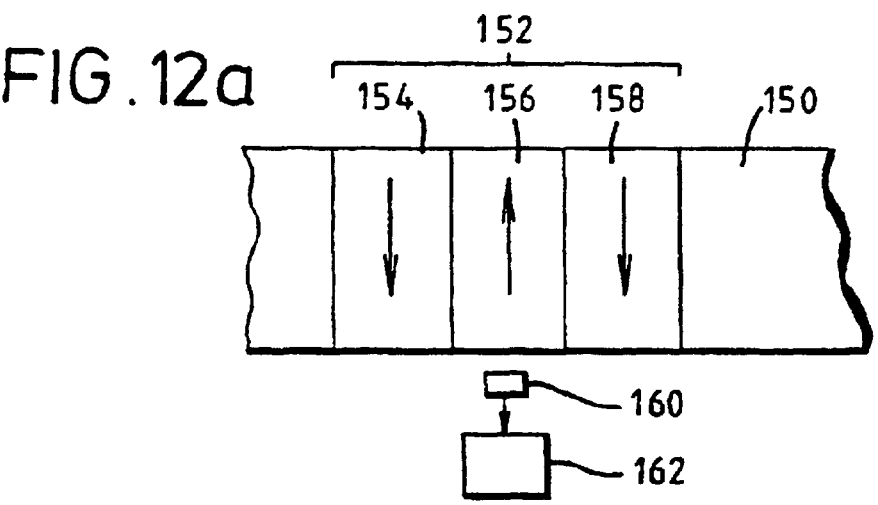
FIG. 12a shows a preferred embodiment in which an inner transducer field with which a sensor co-operates is assisted by two guard rings of magnetisation.

The use of multiple circumferential fields disposed axially along the shaft is employed in a new way by utilising guard fields to each side of an inner field to enhance the performance of the inner zone as a torque transducer element. FIG. 12a shows a diagrammatic illustration of this situation using three fields; a transducer field and two guard fields.

In FIG. 12a, there is shown a solid shaft 150 of a material capable of exhibiting magnetoelasticity. A portion 152 of the shaft is subject to applied magnetic fields to create three next adjacent zones 154, 156 and 158 that are circumferentially magnetised as indicated by the arrows to have outer zones 154 and 158 of opposite polarity magnetisation to that of the inner zone 156. The boundaries marked between the zones are purely notional for clarity of illustration. This arrangement is generally in accord with that shown in FIG. 4a and obtained by using such exterior magnetising means as appropriate as has been previously described. It is assumed that in the absence of any torque in shaft 150, the circumferential fields are contained within the shaft. A magnetic field sensor 60 is placed adjacent zone 156 to sense the field emanating from this zone when the shaft is under torque. Sensor 160 responds to zone 156 only. It is not affected by any fields emanated from zones 154 and 158. The sensor 160 may comprise a single sensing device or any arrangement of sensing devices desired and is connected to signal processing circuitry 162. The adjacent zones 154 and 158 are not intended to participate directly in self-emanation of magnetic field for external sensing when the shaft 150 is subject to torque. They are intended to act as guard zones enhancing the emanation of exterior magnetic field from the inner zone 156. The explanation of this effect is believed to be as follows.

The respective circumferential magnetisation in each of zones 154, 156 and 158 are applied to extend as deeply into the shaft as possible. Investigation has shown that in practice the magnetisation does not penetrate into a central core of the shaft. This means that, as previously discussed, the solid shaft can incorporate a central bore since this core volume will in any event play no real part in operation. However a substantially radial thickness of shaft material remains, e.g. 70% or more of the shaft radius assuming a circular shaft.

The effect of the fields in the guard zones 154 and 158 is to repel the opposite polarity magnetic field in inner zone 156. This applies particularly when the shaft is under torque causing the circumferential field in zone 156 to skew so that magnetic poles are formed at opposite sides of the zone in the axial direction so as to generate a magnetic flux linking the two sides. The effect of the guard zones is to act against this linking flux establishing itself within the material of the shaft, where it is not available to the sensor 160, and to force the linking flux to take the external air path, thereby emanating from the zone 156 for detection by sensor 160.

Thus the provision of guard fields around a transducer element constituted by a portion of the shaft itself not only incorporate the advantages of avoiding the prior art complexities of establishing a separate transducer element as detailed above, it enables a deep level of magnetisation to be achieved in a substantial depth of material together with an efficient means of generating an external torque-dependent magnetic field detectable by an exterior sensor. The guard fields also provide additional functions. They aid in preventing the transducer fields or fields (FIG. 12b) between them from leaching away or deteriorating over time. This is a stabilising function. They also assist in protecting the transducer field or fields between them from being disturbed by magnetic fields that may be induced elsewhere in the shaft. This is a blocking function.

Investigation has shown that the technique just described tends to render the transducer less sensitive to magnetic disturbance in use. For example, the shaft may be eventually used in a machine where other machine parts of ferromagnetic material are moving in the vicinity of the transducer element. Separate thin ring transducers of the prior art are rather susceptible to being disturbed by such parts unless special screening measures are taken. The above described proposal of a transducer element as a portion of the shaft with guard rings appears to considerably reduce such problems.

Figure 12B:
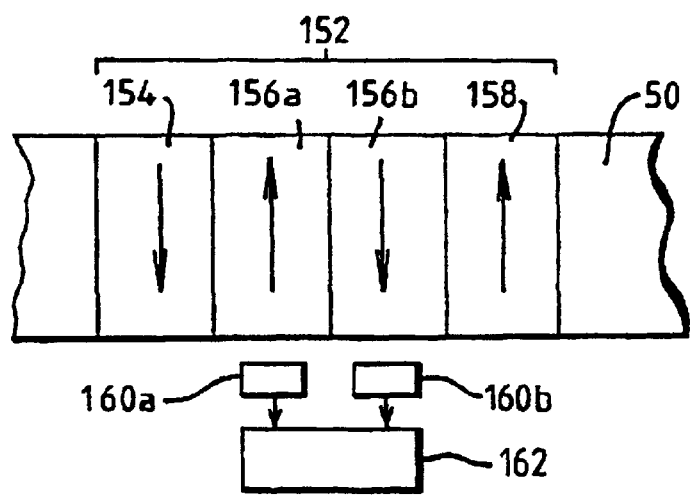
FIG. 12b shows a modification of FIG. 12 in which guard rings are applied to a pair of inner transducer fields of opposite polarity to which the sensing is applied.

FIG. 12b shows an adaptation of the principle of guard fields in FIG. 12a to a case where sensing is done with the aid of two inner oppositely polarized, circumferential fields 156a, 156b which are to act as transducer fields. The fields emanated by the two zones 156a, 156b are sensed by respective sensor arrangements 160a, 160b enabling the transducer system to provide compensation for the effects of external magnetic fields, such as the earth's magnetic field. In FIG. 12b the two outer guard ring fields 154 and 158 are now of opposite polarity so that each guard ring 154 and 158 is of opposite polarity to the inner transducer field 156a and 156b respectively to which it is next adjacent. Each of the inner transducer fields 156a and 156b is thus bounded by two fields of opposite polarity.

The effect of a transducer field of one polarity having a respective field of opposite polarity at each side, irresepetive of whether the neighbouring field is a guard field or a transducer field, can be considered as follows taking FIG. 12a by way of example. Assume a torque is applied that makes the left and right sides of region 156, as seen in the drawing, to be north and south poles respectively. The same torque will be present in guard fields 154 and 158 but, because of their opposite circumferential magnetisation to region 156, they will have north and south poles to the right and left respectively. Thus at the interface between regions 154 and 156, there are like poles (north) abutting and there are like poles (south) abutting between regions 156 and 158. The torque-generated fields from neighbouring regions repel one another. The result is that rather than the torque-generated field of a single region tending to close itself by flux linkage within the material, the flux is emanated outwardly in a loop external to the region so as to be detectable by a sensor such as 160.

From the foregoing paragraph, it will be understood that it may be possible to separate neighbouring regions to a certain extent provided that the field repulsion at the interface region is still effective.

Figure 13A:
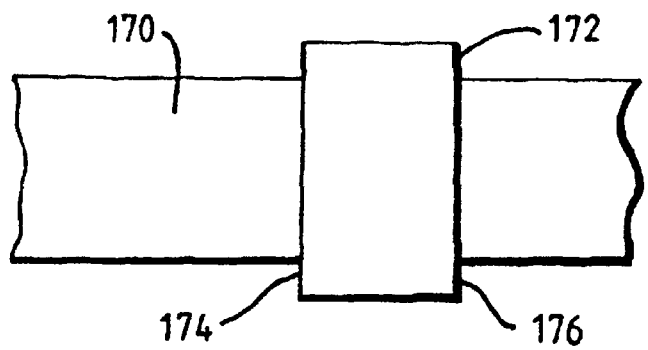
FIG. 13a shows another embodiment using a shaft having an integral raised profile section acting as the transducer element.
Figure 13B:
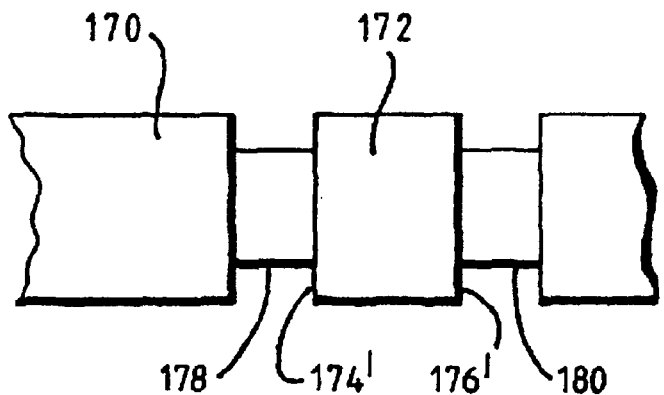

Another embodiment of the invention is illustrated in FIGS. 13a and 13b. This is also concerned with enhancing the emanation of flux from a solid shaft to improve the efficiency of torque detection.

As has already been noted, with circumferential magnetisation of the transducer element in the shaft, the flux in the no-torque state is essentially contained within the shaft so that the exterior magnetic field sensor produces a zero output. When the transducer element is subject to torque, the circumferential field is skewed so that the opposite sides of the transducer element in the axial direction act to provide opposite poles from which emanates a magnetic flux to link the two poles. This flux provides the external, torque-dependent, magnetic field detectable by the sensor arrangement.

It is now proposed to provide means at the sides of the zone of the shaft providing the transducer element to aid in the emanation of the linking magnetic flux externally of the shaft.

Referring to FIG. 13a, a solid shaft 170 is shown as having an outwardly projecting or raised integral annular section 172. That is the material of the annulus 172 is homogeneous with that of the remainder of the shaft, the ring having been produced in casting or by machining the shaft. The section 172 is circumferentially magnetised to provide a transducer element. This may be just one circumferential field extending between exposed sides 174 and 176 of the section 172. The field extends inwardly towards the axis in the manner previous discussed. The section 172 has exposed sides 174 and 176 which enhance the ability of the magnetic flux to escape from the section 172 to link in an external loop between the two sides for detection by the external sensor. The sides 174 and 176 may be sloped and it will be appreciated that corners may in practice be rounded off. The annular section may have an exterior surface profile other than a regular, smooth, cylinder.

The annular section 172 may support more than one circumferential field. For example, two oppositely polarised fields could be supported, one extending from side 174 and the other from side 176. At the interface between the two fields emanation of external magnetic flux is assisted by the mutual repulsion already described in relation to FIGS. 12a and 12b, while at the other boundary of each circumferential field flux emanation is assisted by a respective one of the two exposed sides. Thus two transducer elements are provided.

FIG. 13b shows a modification of the shaft 170 which avoids having a transducer ring section projecting beyond the profile of the remainder of the shaft body. In this case, the transducer ring section 172 is defined within the profile of the shaft body by machining a pair of annular grooves 178 and 180 which provide the exposed sides 174' and 176' for enhancing flux emanation.

Figure 13C:
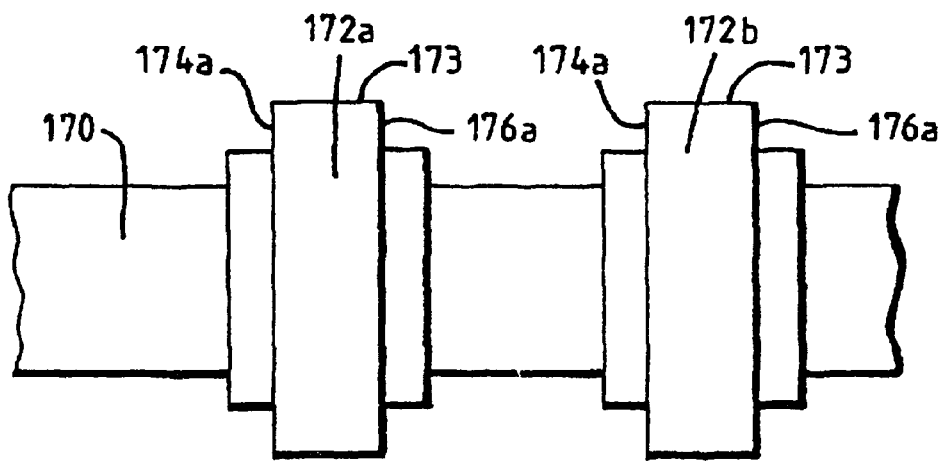

Another variation of the raised profile technique is seen in FIG. 13c. The figure shows two features which may be independently applied.

The first feature is the provision of more than one integral section such as axially spaced sections 172a and 172b providing separate transducer elements, e.g. of opposite polarities of circumferential magnetisation. In this case each section 172a and 172b has a single direction of magnetisation associated with it. Each section provides the sides for emanating the torque-dependent field described with reference to FIG. 13a.

A second feature also illustrated in FIG. 13c is to form each annular section in a stepped fashion narrowing from the base. This construction may be preferred for mechanical strength where the sections 172a, 172b project radially outwardly to a substantial extent from a shaft of relatively small diameter. The transducer field in each section, or in the single section if that is the case, is essentially contained within the lateral confines of upper step 173 (and extending into the body of the shaft) so that the field emanation is primarily from upper side surfaces 174a, 176a.

The integral transducer structures of FIGS. 13a, 13b and 13c inherently respond with the torque applied in the shaft, thereby avoiding the problems of securing a separate transducer ring. These embodiments also have particular application to the employment of just a single circumferential field of a given polarity within the or each transducer element.

The raised profile embodiments of FIGS. 13a and 13c are also of particular value in providing a solution to or at least a substantial mitigation of another problem.

All mechanical power transmitting shafts have a limit as to how much torque/force cycling they can withstand before mechanical damage may occur. This is defined in the industry as the yielding point.

Figure 15:
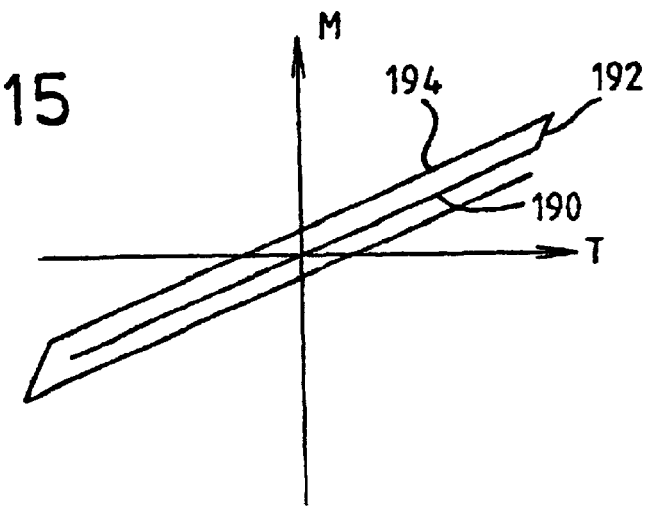
FIG. 15 shows a diagram illustrating a hysteresis effect that may impair accuracy of torque measurement.

The torque and force sensor technology described herein is sensitive to mechanical overload where the shaft is subject to torque/force beyond a certain point, usually defined as a percentage of the yielding point. In the case of a shaft subject to torque, the smaller the shaft diameter for a given applied torque, the greater the internal stress. Eventually in use, a hysteresis effect arises in the elasticity of the shaft material which affects the accuracy of measurement. Take the example of FIG. 12a together with FIG. 15. The field emanated by the transducer regions 156 and the corresponding signal output by sensor device 160, will normally fall on a linear curve 190 shown in FIG. 15 where the output field strength M is plotted against torque T (the negative T axis indicates a reversed direction of rotation). If, however, the torque becomes higher than a certain limit the curve becomes non-linear, as at 192, and the response returns along a different line 194. A mechanical hysteresis loop can be established as illustrated around which the transducer element cycles.

This harmful possibility can be eliminated or at least mitigated by increasing the diameter of the shaft at the region where the torque measurement is made. This can be done by the raised profile sections of FIGS. 13a and 13c which not only provide the transducer elements as already described but provide increased shaft diameter, thereby reducing the stresses in the material, at the zone of torque measurement.

It is important to stress that no overload limits exist for this form of torque sensor other than the physical limits of the shaft itself, which may deform permanently or be stressed beyond its elastic limit if the torque applied is too great.

In summary, embodiments of the invention have been described above in which the following points are particularly noted.

1. A shaft that has been magnetised over a portion or its entire length can be used in a torque sensor or force sensor by sensing the change in the emanation of the magnetic flux from the magnetised part of the shaft. This is because the amount of flux emanating from the shaft varies with the torque or force applied.
2. The flux emanating from the shaft under zero torque or zero force conditions may or may not be zero.
3. The magnetic field induced in the shaft may be circumferential, axial or in some other direction. There may be one or more of any of these fields. Multiple fields may be employed for one or more of the following reasons;
   a. To cancel out external fields (through the use of opposing fields within the shaft, their flux being detected by opposing sensors).
   b. To improve the amount of signal emanating from the shaft.
   c. As "keeper" fields.
   d. The "keeper" fields also act to prevent the magnetic signal from remaining within the shaft.
4. Shaft may:
   a. Be any shape
   b. Be substantially solid in cross-section
   c. Be laminated or plated or not
   d. Be heat treated or not
   e. Be irregular in cross section
   f. Rotate or not (for the torque sensor): move or not (for the force sensor).
5. The flux emanating from these fields may be detected by one or more magnetic field sensitive elements.
6. The field or fields may be introduced into a shaft that has previously been degaussed or not. A shaft may therefore have some sections that are magnetised and some that are not. The magnetised section that emanates flux under torque or force may be bounded by magnetised or demagnetised shaft portions.
7. There are many ways of introducing magnetic fields into shafts, which may or may not be rotating during magnetisation. One may use:
   a. electric current through the shaft
   b. electromagnets
   c. permanent magnets
   d. current carrying coils which may or may not be wrapped around other objects (e.g. toroids).
8. There are many ways of sensing the magnetic flux emanating from the shaft, and one or more of these sensing elements may be used in conjunction with the one or more magnetic fields that have been introduced into the shaft:
   a. Solid state sensor
   b. Hall effect sensor
   c. Magnetoresistance device
   d. Magnetometer
   e. Compass
   f. Inductive coils.

The use of sensing elements that provide an output dependent on the amount and the direction of the magnetic flux emanating from the shaft can provide an indication of the torque or force vector. The use of elements that provide an output dependent only on the amount of magnetic flux will give an indication of the magnitude of the torque or force.

9. A method of producing a shaft capable of acting as a transducer in a torque or force sensor through:
   a. (optional step) Establishing a known magnetic state in the shaft by degaussing or magnetising the shaft.
   b. Introducing a known field (or fields) in the shaft to make it a torque or force sensor. This field (or fields) could have any orientation, as described above. The known field(s) should be less than the field(s) required in the torque or force sensor application.
   c. Applying a known torque or force and measuring the flux emanating from the shaft (or the change in flux), and comparing that with the expected value.
   d. Use the difference between the actual value and the expected value (or the actual change and the expected change) to increase the strength of the field(s) in the shaft so that it will emanate the "correct" amount of flux for all torques or forces.
10. Multiple sensing elements can be arranged to cancel out the effects of external magnetic fields.
11. Multiple sensing elements can be arranged around the shaft to compensate for transverse movement of the shaft.

What is claimed is:

1. A torque sensor arrangement comprising:

a shaft operably mounted to have a torque applied at one end portion thereof acting to rotate the shaft about a longitudinal axis, said shaft having a transducer element comprising first and second zones, each of which is a respective integral portion of the shaft, said first and second zones being disposed along said longitudinal axis and each being magnetised to emanate an external magnetic flux that is a function of a torque applied about said longitudinal axis, each of said first and second zones having axially-spaced end portions defining magnetic poles of opposite polarity between which the external magnetic flux is emanated to have an essentially axially-directed component at a location intermediate the end portions, said first and second zones being magnetised with magnetisations of opposite polarity, a sensor arrangement comprising a first sensor located adjacent said first zone at a location intermediate the end portions of the first zone, a second sensor located adjacent said second zone at a location intermediate the end portions of the second zone, said first and second sensors being responsive to the axially-directed component of magnetic flux emanated by said first and second zones respectively, and signal processing means to which said first and second sensors are connected to cancel an external axially-directed magnetic field common to said first and second sensors and to develop an output signal representing the torque about said longitudinal axis.

2. The torque sensor arrangement of claim 1, wherein said shaft had third and fourth magnetised zones spaced along said longitudinal axis with said first and second zones located therebetween, each of said third and fourth magnetised zones being a respective integral portion of the shaft.

3. The torque sensor arrangement of claim 1, wherein said shaft has third and fourth magnetised zones spaced along said longitudinal axis with said first and second zones therebetween, each of said third and fourth zones being a respective integral portion of the shaft, and said sensor arrangement is responsive only to magnetic flux emanated by said first and second zones.

4. The torque sensor arrangement of claim 1 in which each of said first and second zones is circumferentially magnetised.

5. The torque sensor arrangement of claim 3 in which each of said first to fourth zones is circumferentially magnetised and adjacent zones have opposite polarities of magnetisation.

6. A force sensor arrangement comprising:
an elongate member operably mounted to have a force applied at one end portion thereto acting to produce a bending moment in the elongate member about a longitudinal axis,
said elongate member having a transducer element comprising first and second zones, each of which is a respective integral portion of the elongate member,
each of said first and second zone having axially-spaced end portions defining magnetic poles of opposite polarity between which the external magnetic flux is emanated to have an essentially axially-directed component at a location intermediate the end portions;
said first and second zones being disposed along said longitudinal axis and each being magnetised to emanate an external magnetic flux that is a function of a bending moment about said longitudinal axis,
said first and second zones being magnetised with magnetisations of opposite polarity,
a sensor arrangement comprising a first sensor located adjacent said first zone at a location intermediate the end portions of the first zone, a second sensor located adjacent said second zone at a location intermediate the end portions of the second zone, said first and second sensors being responsive to the axially-directed component of magnetic flux emanated by said first and second zones respectively, and
signal processing means to which said first and second sensors are connected to cancel an external axially-directed magnetic field common to said first and second sensors to develop an output signal representing the torque about said longitudinal axis.

7. The force sensor arrangement of claim 6, wherein said elongate member has third and fourth guard zones spaced along said longitudinal axis with said first and second zones located therebetween, each of said third and fourth magnetised zones being a respective integral portion of the elongate member.

8. The force sensor arrangement of claim 6, wherein said elongate member has third and fourth magnetised zones spaced along said longitudinal axis with said first and second zones therebetween, each of said third and fourth zones being a respective integral portion of the shaft, and
said sensor arrangement is responsive only to magnetic flux emanated by said first and second zones.

9. The force sensor arrangement of claim 6 in which each of said first and second zones is circumferentially magnetised.

10. The force sensor arrangement of claim 8 in which each of said first to fourth zones is circumferentially magnetised and adjacent zones have opposite polarities of magnetisation.

11. A torque sensor arrangement comprising:
a shaft operably mounted to have a torque applied at one end portion thereof acting to rotate the shaft about a longitudinal axis,
said shaft having a transducer element comprising an integral portion of the shaft that is magnetised to emanate an external magnetic flux that is a function of a torque applied about said longitudinal axis,
said transducer element having axially-spaced end portions defining magnetic poles of opposite polarity between which the external flux is emanated to have an essentially axially-directed component at a location intermediate the end portions,
a sensor arrangement comprising first and second sensors located adjacent said transducer element intermediate the end portions thereof and responsive to the axially-directed component of magnetic flux emanated thereby, said first and second sensors being disposed adjacent radially opposite sides of the elongate member with respect to said longitudinal axis, and
signal processing means to which said first and second sensors are connected in an additive manner to develop an output signal representing the torque about said longitudinal axis.

12. A torque sensor arrangement as claimed in claim 11, wherein
said shaft has first and second magnetised guard zones spaced along said longitudinal axis, each of said first and second magnetised guard zones being a respective integral portion of the shaft,
said transducer element being located between said first and second magnetised guard zones.

13. A torque sensor arrangement as claimed in claim 11 in which said integral portion is circumferentially magnetised.

14. A torque sensor arrangement as claimed in claim 12 in which each integral portion is circumferentially magnetised and adjacent integral portion have opposite polarities of magnetisation.

15. A force sensor arrangement comprising:
an elongated member operably mounted to have a force applied thereto acting to produce a bending moment in the elongate member about a longitudinal axis,
said elongate member having a transducer element comprising an integral portion of the elongate member that is magnetised to emanate an external magnetic flux that is a function of a bending moment about said longitudinal axis,
said transducer element having axially-spaced end portions defining magnetic poles of opposite polarity between which the external flux is emanated to have an essentially axially-directed component at a location intermediate the end portions;
a sensor arrangement comprising first and second sensors located adjacent said transducer element intermediate the end portions thereof and responsive to the axially-directed component of magnetic flux emanated thereby, said first and second sensors being disposed adjacent radially opposite sides of the elongate member with respect to said longitudinal axis, and signal processing means to which said first and second sensors are connected in an additive manner to develop an output signal representing the bending moment about said longitudinal axis.

16. A force sensor arrangement as claimed in claim 15, wherein said elongate member has first and second magnetised guard zones spaced along said longitudinal axis, each of said first and second magnetised guard zones being a respective integral portion of the elongate member, said transducer element being located between said first and second magnetised guard zones.

17. A force sensor arrangement as claimed in claim 15 in which said transducer element is circumferentially magnetised.

18. A force sensor arrangement as claimed in claim 16 in which each integral portion is circumferentially magnetised and adjacent integral portions have opposite polarities of magnetisation.

* * * * *